(12) United States Patent
Lesso

(10) Patent No.: US 12,107,494 B2
(45) Date of Patent: Oct. 1, 2024

(54) DC-DC CONVERTER WITH RESERVOIR CIRCUITRY

(71) Applicant: Cirrus Logic International Semiconductor Ltd., Edinburgh (GB)

(72) Inventor: John P. Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 212 days.

(21) Appl. No.: 17/704,142

(22) Filed: Mar. 25, 2022

(65) Prior Publication Data

US 2023/0308014 A1    Sep. 28, 2023

(51) Int. Cl.
*H02M 3/07* (2006.01)
*H02M 1/00* (2007.01)

(52) U.S. Cl.
CPC ........... *H02M 3/07* (2013.01); *H02M 1/0067* (2021.05); *H02M 1/0083* (2021.05); *H02M 1/0095* (2021.05)

(58) Field of Classification Search
CPC .............................. H02M 3/07; H02M 1/0095
See application file for complete search history.

(56) References Cited

U.S. PATENT DOCUMENTS

| | | | |
|---|---|---|---|
| 9,236,794 B2 * | 1/2016 | Lesso | H02M 3/07 |
| 9,306,448 B2 * | 4/2016 | Lesso | H03G 1/0094 |
| 10,218,255 B1 * | 2/2019 | Petersen | H02M 3/158 |
| 10,615,697 B1 | 4/2020 | Ferrari et al. | |
| 2011/0103619 A1 * | 5/2011 | Lesso | H03G 1/0017 330/297 |
| 2012/0326771 A1 * | 12/2012 | MacFarlane | H02M 3/07 327/536 |
| 2016/0352219 A1 | 12/2016 | Amgad Abdulslam et al. | |

(Continued)

FOREIGN PATENT DOCUMENTS

| | | |
|---|---|---|
| CN | 113938013 A * | 1/2022 |
| WO | WO-2020263288 A1 * | 12/2020 ......... H02M 1/0095 |

(Continued)

OTHER PUBLICATIONS

International Search Report and Written Opinion of the International Searching Authority, International Application No. PCT/GB2023/050304, mailed Apr. 24, 2023.

*Primary Examiner* — Sisay G Tiku
(74) *Attorney, Agent, or Firm* — Jackson Walker L.L.P.

(57) ABSTRACT

A DC-DC converter for converting an input voltage at an input node, the converter comprising: first and second inductor nodes for connection of an inductor therebetween; first and second flying capacitor nodes for connection of a flying capacitor therebetween; a first switching network for selectively connecting the first flying capacitor node to each of the input node and the first inductor node; a second switching network for selectively connecting the second flying capacitor node to each of the input node and a reference voltage node; and reservoir circuitry, comprising: first and second reservoir capacitor nodes for connection of a reservoir capacitor therebetween; a third switching network for selectively connecting the first reservoir capacitor node to each of the first and second flying capacitor nodes; a fourth switching network for selectively connecting the second reservoir capacitor node to each of the second flying capacitor node and the reference voltage node.

15 Claims, 21 Drawing Sheets

(56) References Cited

U.S. PATENT DOCUMENTS

| | | | |
|---|---|---|---|
| 2021/0234462 A1* | 7/2021 | Cannillo | G05F 1/595 |
| 2021/0336530 A1* | 10/2021 | Shen | H02M 1/32 |
| 2022/0040731 A1* | 2/2022 | Lesso | B06B 1/0207 |
| 2022/0115953 A1* | 4/2022 | Rainer | H02M 3/1584 |
| 2022/0224231 A1* | 7/2022 | Rizzolatti | H02M 1/0095 |
| 2023/0268835 A1* | 8/2023 | Lesso | H02M 3/1582 |
| | | | 323/271 |
| 2023/0353036 A1* | 11/2023 | Rizzolatti | H02M 1/009 |
| 2023/0353058 A1* | 11/2023 | Rizzolatti | H02M 3/155 |

FOREIGN PATENT DOCUMENTS

| | | | | |
|---|---|---|---|---|
| WO | WO-2021033412 A1 * | 2/2021 | | H02M 1/0095 |
| WO | WO-2021138912 A1 * | 7/2021 | | |
| WO | WO-2024031184 A1 * | 2/2024 | | |

\* cited by examiner

| Phase | 0 < VOUT < 0.5VIN | 0.5VIN < VOUT < VIN |
|---|---|---|
| 1 | S1, S3 | S1, S3 |
| 2 | S3, S4 | S1, S2 |
| 3 | S2, S4 | S2, S4 |
| 4 | S3, S4 | S1, S2 |

| Phase | Switches closed |
|---|---|
| 1 | S1, S3, A2, A4 |
| 2 | S3, S4 |
| 3 | S2, A1, A3, A4 |
| 4 | S3, S4 |

| Phase | Switches closed |
|---|---|
| 1 | S1, S3, A2, A4 |
| 2 | S1, S2, A1, A3 |
| 3 | S2, A1, A3, A4 |
| 4 | S3, S4 |

| Phase | Switches closed |
|---|---|
| 1 | S1, S3, A1, A3 |
| 2 | S3, S4, A1, A3 |
| 3 | S2, S4, A1, A3 |
| 4 | S3, S4, A1, A3 |

| Phase | Switches closed |
|---|---|
| 1 | S1, S3, A1, A3 |
| 2 | S1, S2, A1, A3 |
| 3 | S2, S4, A1, A3 |
| 4 | S3, S4, A1, A3 |

| Phase | Switches closed |
|---|---|
| 1 | S1, S2, A1, A3, A4 |
| 2 | S2, A2, A4 |

| Phase | Switches closed |
|---|---|
| 1 | S1, S2, A2, A4 |
| 2 | S1, S2, A1, A3 |
| 3 | S2, A1, B1 |
| 4 | S1, S2, A1, A3 |

VIN < VOUT < 1.5 VIN

| Phase | Switches closed |
|---|---|
| 1 | S1, S2, A2, A4 |
| 2 | S1, S2, A1, A3 |
| 3 | S2, A1, A3, B1 |
| 4 | S2, A1, A3, B1 |

1.5 VIN < VOUT < 2 VIN 1.5 VIN < VOUT < 2 VIN

| Phase | Switches closed |
|---|---|
| 1 | S1, S2, A2, A4 |
| 2 | S2, A1, B1 |
| 3 | S3, A1, B1 |
| 4 | S2, A1, B1 |

| Phase | Switches closed | |
|---|---|---|
| 1 | S1, S3, A1, A3 | S3', S4' |
| 2 | S3, S4 | S2', S4', A2', A3' |
| 3 | S2, S4, A2, A3 | S3', S4' |
| 4 | S3, S4 | S1, S3, A1', A3' |

Fig. 15

| Phase | Switches closed | |
|---|---|---|
| 1 | S1, S3, A1, A3 | S3' S4', A1' A3' |
| 2 | S3, S4, A1, A3 | S2', S4', A1', A3' |
| 3 | S2, S4, A1, A3 | S3', S4', A1', A3' |
| 4 | S3, S4, A1, A3 | S1', S3', A1', A3' |

Fig. 16

| Phase | Switches closed | |
|---|---|---|
| 1 | S1, S2, A1, A3, A4 | S2', A2', A4' |
| 2 | S2, A2, A4 | S1', S2', A1', A3', A4' |

Fig. 17

| Phase | Switches closed |
|---|---|
| 1 | S1, S3, S4, A1 |
| 2 | S2, A2 |

DC-DC CONVERTER WITH RESERVOIR CIRCUITRY

TECHNICAL FIELD

The present disclosure relates to DC-to-DC power converters.

BACKGROUND

DC to DC power converters typically use one or more switching devices to control the connection of one or more capacitors to voltage sources and to one another, to obtain voltages other than the input voltage value. Such converters may include a capacitor, known as a "flying capacitor", for transferring charge to a load. The switching device(s) are configured to control the charging and discharging of the flying capacitor in cycles to achieve the desired output voltage based on an input signal.

For some applications, it may be desirable to reduce voltage load applied to switches and inductors of such power converters to reduce power loss associated with such components and to reduce their size and complexity.

SUMMARY

According to a first aspect of the disclosure, there is provided a DC-DC converter for converting an input voltage at an input node, the converter comprising: first and second inductor nodes for connection of an inductor therebetween; first and second flying capacitor nodes for connection of a flying capacitor therebetween; a first switching network for selectively connecting the first flying capacitor node to each of the input node and the first inductor node; a second switching network for selectively connecting the second flying capacitor node to each of the input node and a reference voltage node; and reservoir circuitry, comprising: first and second reservoir capacitor nodes for connection of a reservoir capacitor therebetween; a third switching network for selectively connecting the first reservoir capacitor node to each of the first and second flying capacitor nodes; a fourth switching network for selectively connecting the second reservoir capacitor node to each of the second flying capacitor node and the reference voltage node.

The DC-DC converter may further comprise: control circuitry configured to control the first, second, third and fourth switching networks.

The control circuitry may be operable in a bolster mode to control the third and fourth switching networks to connect the reservoir capacitor in parallel with the flying capacitor for the duration of the bolster mode. Connecting the reservoir capacitor in parallel with the flying capacitor may comprises: connecting the first reservoir capacitor node to the first flying capacitor node; and connecting the second reservoir capacitor node to the second flying capacitor node.

The control circuitry may be operable in a stabilisation mode. During a first phase of the stabilisation mode the control circuitry may be operable to control the third and fourth switching networks to connect the reservoir capacitor and the flying capacitor in series. During a second phase of the stabilisation mode the control circuitry may be operable to control the third and fourth switching networks to connect the reservoir capacitor and the flying capacitor in parallel.

During the first phase of the stabilisation mode, whilst reservoir capacitor is connected in series with the flying capacitor, the control circuitry may be operable to control the first and second switching networks to connect the first flying capacitor node to the input node; and to connect the second flying capacitor node to the first inductor node.

During the second phase of the stabilisation mode, whilst the reservoir capacitor is connected in parallel with the flying capacitor, the control circuitry may be operable to control the first and second switching networks to connect the first flying capacitor node to the first inductor node.

The control circuitry may be operable in a boost mode. During a first phase of the boost mode, the control circuitry may be operable to control the first and second switching networks and the reservoir circuitry to: connect the reservoir capacitor and the flying capacitor in parallel; and connect the input node to the first inductor node.

During a second phase of the boost mode, the control circuitry may be operable to control the first and second switching networks and the reservoir circuitry to: connect the reservoir capacitor and the flying capacitor in series between the reference voltage node and the first inductor node.

The first switching network may comprise: a first switch coupled between the first flying capacitor node and the input node, and a second switch coupled between the first flying capacitor node and the first inductor node. The second switching network may comprise: a third switch coupled between the second flying capacitor node and the input node, and a fourth switch coupled between the second flying capacitor node and the reference voltage node. The third switching network may comprise: a fifth switch coupled between the first reservoir capacitor node and the first flying capacitor node, and a sixth switch coupled between the first reservoir capacitor node and the second flying capacitor node. The fourth switching network may comprise: a seventh switch coupled between the second reservoir capacitor node and the second flying capacitor node, and an eighth switch coupled between the second reservoir capacitor node and the reference voltage node.

Any of the switches described above may comprise a MOSFET device or a BJT devices or a IGBT device.

The DC-DC converter may comprise a mode switch coupled between the second reservoir capacitor node and the input node.

According to another aspect of the disclosure, there is provided a DC-DC converter for converting an input voltage at an input node, the converter comprising: first and second inductor nodes for connection of an inductor therebetween; first and second flying capacitor nodes for connection of a flying capacitor therebetween; a first switching network for selectively connecting the first flying capacitor node to each of the input node and the first inductor node; a second switching network for selectively connecting the second flying capacitor node to each of the input node and a reference voltage node; and reservoir circuitry, comprising: first and second reservoir capacitor nodes for connection of a reservoir capacitor therebetween; a third switching network for selectively connecting the first reservoir capacitor node to each of the first and second flying capacitor nodes; a fourth switching network for selectively connecting the second reservoir capacitor node to each of the first flying capacitor node and the reference voltage node.

The DC-DC converter may further comprise a mode switch coupled between the first reservoir capacitor node and the input node.

According to another aspect of the disclosure, there is provided a multiphase DC-DC converter comprising: a first converter comprising a DC-DC converter as described above; and a second converter comprising a DC-DC converter as described above, where the second inductor node of the first converter is coupled to the second inductor node of the second converter.

In some embodiment, the first reservoir capacitor node of the first converter may be coupled to the first reservoir capacitor node of the second converter, and the second reservoir capacitor node of the first converter may be coupled to the second reservoir capacitor node of the second converter. In other embodiments the first and second converters may share a reservoir capacitor.

According to another aspect of the disclosure, there is provided a DC-DC converter for converting an input voltage to an output voltage, comprising: a main stage comprising: a flying capacitor; and a main switch network, the main stage configured to receive the input voltage at an input node and output the output voltage at an output node; and an auxiliary stage comprising: an auxiliary flying capacitor; and an auxiliary switch network, wherein the auxiliary stage is operable in: a boost mode to boost the output voltage at the output node to a voltage higher than the input voltage; and a buck mode to increase an effective capacitance of the flying capacitor or balance stored charge between the flying capacitor and the auxiliary flying capacitor.

According to another aspect of the disclosure, there is provided a DC-DC converter for converting an input voltage to an output voltage, comprising: a main stage comprising: a flying capacitor; and a main switch network, the main converter stage configured to receive the input voltage at an input node and output the output voltage at an output node; and an auxiliary stage comprising: an auxiliary flying capacitor; and an auxiliary switch network, wherein the auxiliary stage operable in: a boost mode in which the auxiliary stage is configured to connect the auxiliary flying capacitor in series with the flying capacitor; and a buck mode in which the auxiliary stage is configured to connect the auxiliary flying capacitor in parallel with the flying capacitor.

According to another aspect of the disclosure, there is provided a DC-DC converter for converting an input voltage at an input node, the converter comprising: first and second inductor nodes for connection of an inductor therebetween; first and second flying capacitor nodes for connection of a flying capacitor therebetween; a first switching network for selectively connecting the first flying capacitor node to each of the input node and to the first inductor node; a second switching network for selectively the second flying capacitor node to the input node and a reference voltage node; and a reservoir circuitry, comprising: first and second reservoir capacitor nodes for connection of a reservoir capacitor therebetween, the second reservoir capacitor node coupled to the reference voltage; a reservoir switching network for selectively connecting the first reservoir capacitor node to each of the first flying capacitor node and the second flying capacitor node; and control circuitry configured, during a boost mode, to control the first switching network, the second switching network and the reservoir switching network: during a first phase, to connect the second flying capacitor node to the input node and the reference voltage node, and the first flying capacitor node to the input node and the first reservoir capacitor node; and during a second phase, to connect the first flying capacitor node to the first inductor node, and the second flying capacitor node to the first reservoir capacitor node.

The first switching network may comprise: a first switch coupled between the first flying capacitor node and the input node, and a second switch coupled between the first flying capacitor node and the first inductor node. The second switching network may comprise: a third switch coupled between the second flying capacitor node and the input node, and a fourth switch coupled between the second flying capacitor node and the reference voltage node. The reservoir switching network may comprise: a fifth switch coupled between the first reservoir capacitor node and the first flying capacitor node, and a sixth switch coupled between the second reservoir capacitor node and the second flying capacitor node.

The first, second, third, fourth, fifth and sixth switches may be MOSFET devices or IGBT devices or BJT devices.

The DC-DC converter may further comprise the flying capacitor and the reservoir capacitor.

The DC-DC converter may further comprise the inductor.

According to another aspect of the disclosure, there is provided an integrated circuit comprising one or more of the DC-DC converter or multiphase converters described above.

Throughout this specification the word "comprise", or variations such as "comprises" or "comprising", will be understood to imply the inclusion of a stated element, integer or step, or group of elements, integers, or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which:

FIGS. 15 to 17 are tables showing switching operation of the converters of FIGS. 13 and 14;

DESCRIPTION OF EMBODIMENTS

Figures 1, 2:
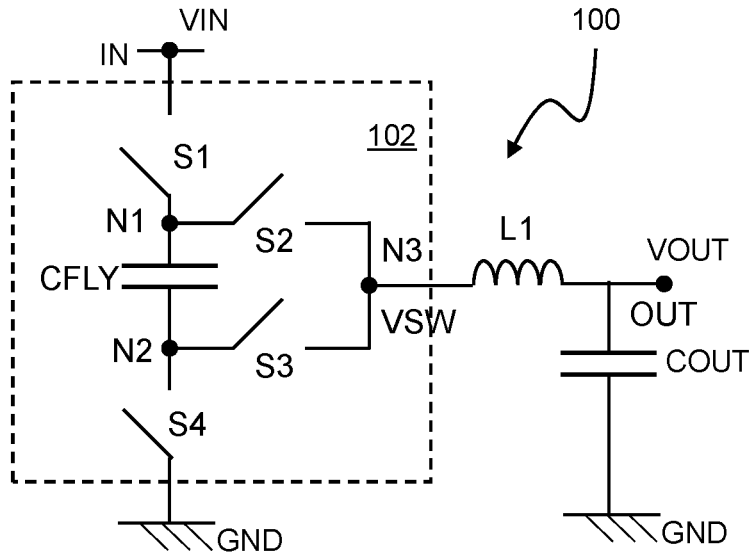
FIG. 1 is a circuit diagram of a known three-level buck converter.
FIG. 2 is a table showing switching operation of the converter of FIG. 1.

FIG. 1 is a circuit diagram of a known three-level buck or step-down converter 100. The power converter 100 comprises a switching cell 102 comprising first, second, third and fourth switches S1, S2, S3, S4 in addition to a flying capacitor CFLY. The converter 100 further comprises an inductor L1.

The flying capacitor CFLY is coupled between first and second flying capacitor nodes N1, N2. The first switch S1 is configured to selectively connect the first flying capacitor node N1 to an input node IN provided with an input voltage VIN. The second switch S2 is configured to selectively connect the first flying capacitor node N1 to the inductor L1 at a switch node N3 (also referred to herein as an inductor node). The third switch S3 is configured to selectively connect the second flying capacitor node N2 to the inductor at the switching node N3. The fourth switch S4 is configured to selectively connect the second flying capacitor node N2 to a voltage reference node, in this case ground GND. In other embodiments the voltage reference may be at a voltage other than ground. The inductor L1 is coupled between the stage output node N3 and a voltage output node VOUT. An optional output (smoothing) capacitor COUT is provided at the output voltage node VOUT.

The first, second, third and fourth switches may be implemented using transistor technology, such as MOSFET, IGBT or BJT technology.

With careful control of the switches S1, S2, S3, S4, the power converter 100 can be operated as a 3-level buck converter, operable to present a voltage at the switch node N3 of VIN, VIN/2, or ground. To do so, the switches S1, S2, S3, S4 are controlled to endeavour to maintain the voltage across the flying capacitor CFLY at VIN/2, as will be explained in more detail with reference to FIG. 2.

To operate the converter 100 such that the output voltage VOUT is between VIN/2 and GND, the switches S1, S2, S3, S4 are controlled so as to alternate the voltage at the switch node N3 between VIN/2 and GND.

During a first phase, the first and third switches S1, S3 are closed (and the second and fourth switches open), presenting VIN-VFLY (i.e. VIN/2 assuming CFLY is charged to VIN/2) at the switch node N3. In this phase, the flying capacitor CFLY is charged whilst the inductor L1 is energised, since the output voltage VOUT is lower than the voltage VSW at the switch node N3.

During a second phase, the third and fourth switches S3, S4 are closed (the first and second switches S1, S2 open) such that the switch node N3 is coupled to ground GND. The flying capacitor CFLY is thus disconnected and the inductor de-energises to ground GND.

During a third phase, the second and fourth switches S2, S4 are closed (and first and third switches S1, S3 open) connecting the flying capacitor CFLY across the switch node N3. The voltage across the capacitor CFLY thus discharges, energising the inductor L1.

It is noted here that any charge added to the flying capacitor CFLY during the first phase should be removed during the third phase, so as to maintain the balance of charge in the capacitor CFLY such that the voltage CFLY across the capacitor is maintained at VIN/2 in steady state operation. In doing so, the duration of the first and third phases are substantially equal.

In a fourth phase, the third and fourth switches S3, S4 are again closed such that the reference voltage (e.g. GND) is provided directly to the inductor L1. This leaves the flying capacitor CFLY disconnected and de-energises the inductor L1.

As the input voltage VIN decreases, to maintain the same output voltage VOUT at the output node OUT, the duty cycle of phases 1 and 3 are increased. This has the effect of reducing the inductor current ripple until a minimum is reached when the input voltage VIN is equal to twice the output voltage VOUT.

When the input voltage VIN decreases to a point at which it is less than twice the output voltage VOUT, the converter 100 is controlled to switch the switch node N3 between VIN and VIN/2. In this mode of operation, the switches are controlled in a different sequence.

During a first phase, the first and third switches S1, S3 are closed (and the second and fourth switches open), presenting VIN-VFLY (i.e. VIN/2 assuming CFLY is charged to VIN/2) at the switch node N3. In this phase, the flying capacitor CFLY is charged whilst the inductor L1 is energised, since the output voltage VOUT is lower than the voltage VSW at the switch node N3.

During a second phase, the first and second switches S1, S2 are closed (the third and fourth switches S3, S4 open) such that the input voltage VIN is provided to the switch node N3. The flying capacitor CFLY is thus disconnected, and the inductor energises to VIN.

During a third phase, the second and fourth switches S2, S4 are closed (and first and third switches S1, S3 open) connecting the flying capacitor CFLY across the switch node N3. Since the voltage across the inductors L1 is greater than the voltage across the flying capacitor CFLY, the inductor L1 de-energises via the load and the flying capacitor CFLY.

During a fourth phase, the first and second switches S1, S2 are again closed such that the input voltage VIN is provided at the switch node N3. This leaves the flying capacitor CFLY disconnected and energises the inductor L1.

Thus, it can be seen that the switching cell 102 may be used to implement both multi-level boost and buck conversion depending on the arrangement of the cell 102. In addition, by switching between levels of buck or boost, the voltage drop across the various inductors L1, L2 in the examples described above is maintained at VIN/2 or less.

Whilst there are several advantages associated with the switching cell 102 shown in FIG. 1, there are also some drawbacks. As mentioned earlier, performance of the switching cell 102 relies on control circuitry maintaining the voltage VFLY across the flying capacitor CFLY at VIN/2. However, in practice, if the voltage CFLY across the flying capacitor CFLY drifts from the ideal VIN/2, the control algorithms used to control the switches S1, S2, S3, S4 may not be able to stabilise control, leading to instability in the voltage provided at the output node VOUT.

Embodiments of the present disclosure aim to address or at least ameliorate one or more of the above problems by implementing novel additional switching architecture to compliment the switching cell 102, that endeavors to ensure the voltage VFLY over the flying capacitor CFLY is maintained as close as possible to VIN/2. The addition of this new switching arrangement has several advantages in addition to stabilizing the voltage VFLY across the flying capacitor CFLY. Embodiments of the disclosure harness the use of an additional (reservoir) capacitor capable of being switched into a series configuration with the flying capacitor as well as a parallel configuration. In doing so, the modified architectures described herein are capable of several modes of operation, namely buck, bolster and boost modes, as which will be discussed in detail below.

Figure 3:
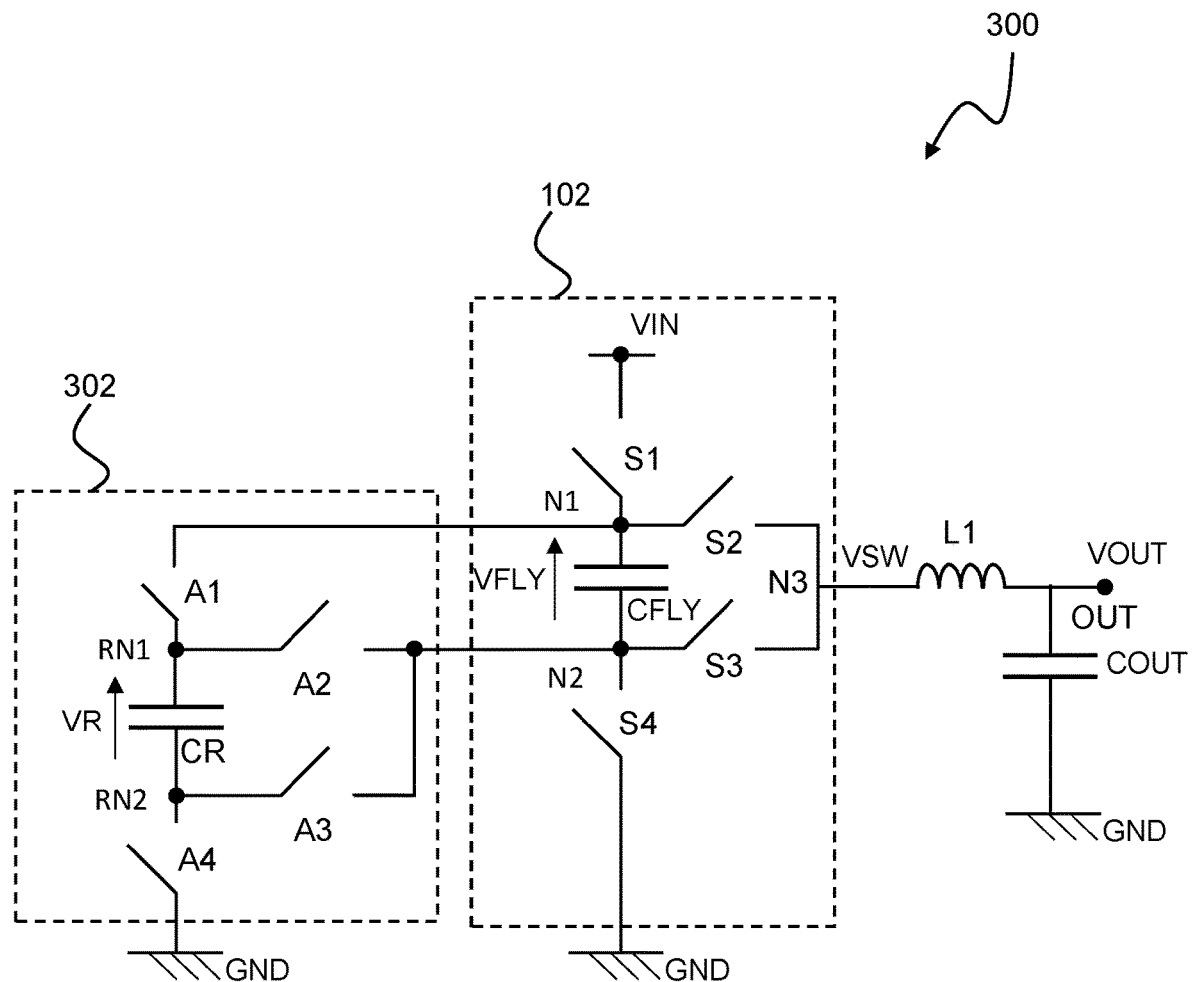
FIG. 3 is a circuit diagram of a power converter according to embodiments of the present disclosure.

FIG. 3 is a circuit diagram of a multilevel buck-boost converter 300. The converter 300 comprises the switching cell 102 described above with reference to FIG. 1 and so like parts of that cell 102 have been provided with like reference numerals. Specifically, the converter 300 comprising first, second, third and fourth switches S1, S2, S3, S4 in addition to a flying capacitor CFLY. The converter 300 may further comprise an inductor L1 coupled to the switching node VSW and a smoothing capacitor COUT coupled to the output node VOUT in a similar arrangement to that shown in FIG. 1.

In addition to the switching cell 102, the converter 300 further comprises reservoir circuitry 302 comprising first, second, third and fourth reservoir switches A1, A2, A3, A4 in addition to a reservoir capacitor CR. The reservoir switches A1, A2, A3, A4 and the reservoir capacitor CR are arranged with respect to one another in a similar manner to the switching cell 102. The reservoir capacitor CR is coupled between first and second reservoir capacitor nodes RN1, RN2. The first reservoir switch A1 is configured to selectively connect the first reservoir capacitor node RN1 to the first flying capacitor node N1. The second reservoir switch A2 is configured to selectively connect the first reservoir capacitor node RN1 to the second flying capacitor node N2. The third reservoir switch A3 is configured to selectively connect the second reservoir capacitor node RN2 to the second flying capacitor node N2. The fourth reservoir switch A4 is configured to selectively connect the second reservoir capacitor node RN2 to a voltage reference node, in this case ground GND. In other embodiments the voltage reference may be at a voltage other than ground.

As noted above, the converter 300 may be operated in several modes, including but not limited to:
1. Stabilised three-level buck mode.
2. Bolstered three-level buck mode.
3. Two-level boost mode.

In stabilised three-level buck mode, the voltage VFLY across the flying capacitor CFLY may be stabilised to VIN/2 using of the reservoir capacitor CR.

In bolstered three-level buck mode, the reservoir capacitor CR may be connected in parallel with the flying capacitor CFLY so as to bolster the overall capacitance (i.e. CFLY+CR) used during buck conversion.

In two-level boost mode, the reservoir capacitor CR may be used to boost the voltage at the switch node VSW to 2VIN.

Operation of the stabilised three-level buck mode to switch the switch node N3 between VIN/2 and GND will now be described with reference to FIGS. 4A to 4D. The switches S1:S4, A1:A4 are controlled in four phases as shown in the table in FIGS. 4A and 5A, with the aim of stabilising the voltage VFLY across the flying capacitor at VIN/2. For operation in the stabilised mode, the capacitance of the reservoir capacitor CR is preferably chosen to be substantially equal to that of the flying capacitor CFLY. In other modes of operation, however, the reservoir capacitor may not have a capacitance which matches the flying capacitor CFLY.

Figures 4A, 4B:
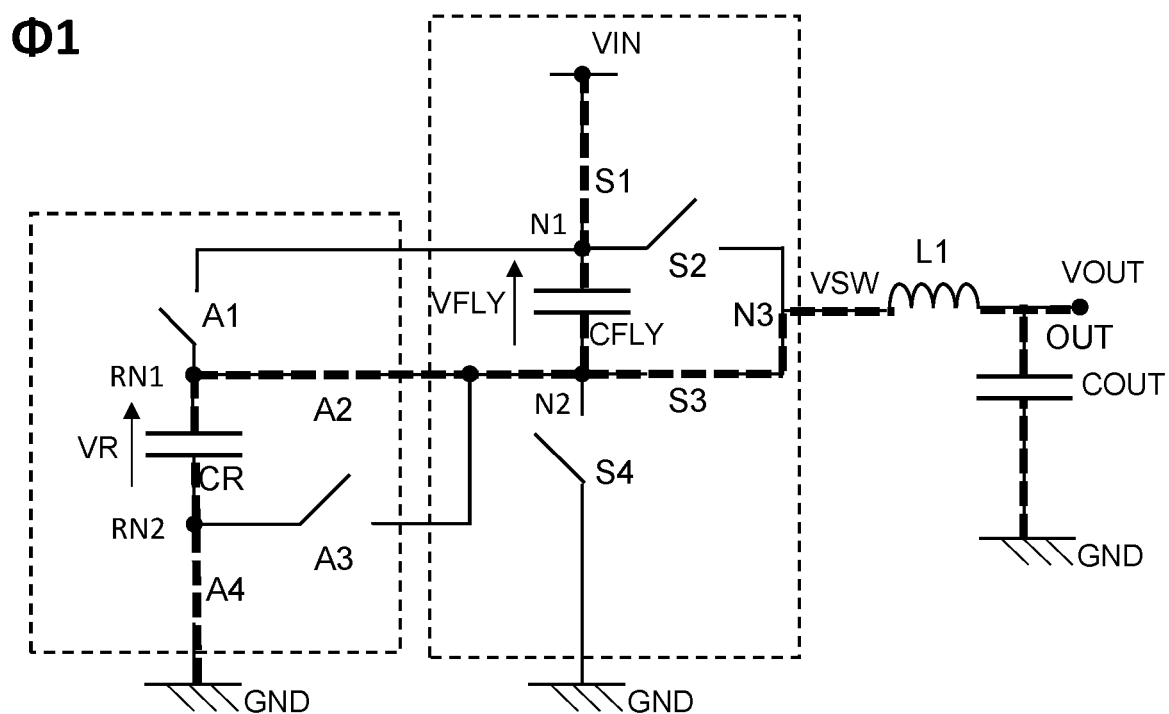
FIG. 4A is a table showing switching operation of the converter of FIG. 3 in a buck mode.
FIGS. 4B to 4D are schematic diagrams illustrating switching configurations denoted in the table in FIG. 4A.

During a first phase shown in FIG. 4B, the first and third switches S1, S3 and the second and fourth reservoir switches A2, A4 are closed (the remaining switches open), such that the flying capacitor CFLY and the reservoir capacitor CR are stacked in series between the input voltage VIN and ground GND. Since the capacitances of the flying capacitor CFLY and the reservoir capacitor CR are substantially equal, the voltage drop across each is equal to VIN/2 and the voltage at the second flying capacitor node FCN2 is thus VIN/2.

Figure 4C:
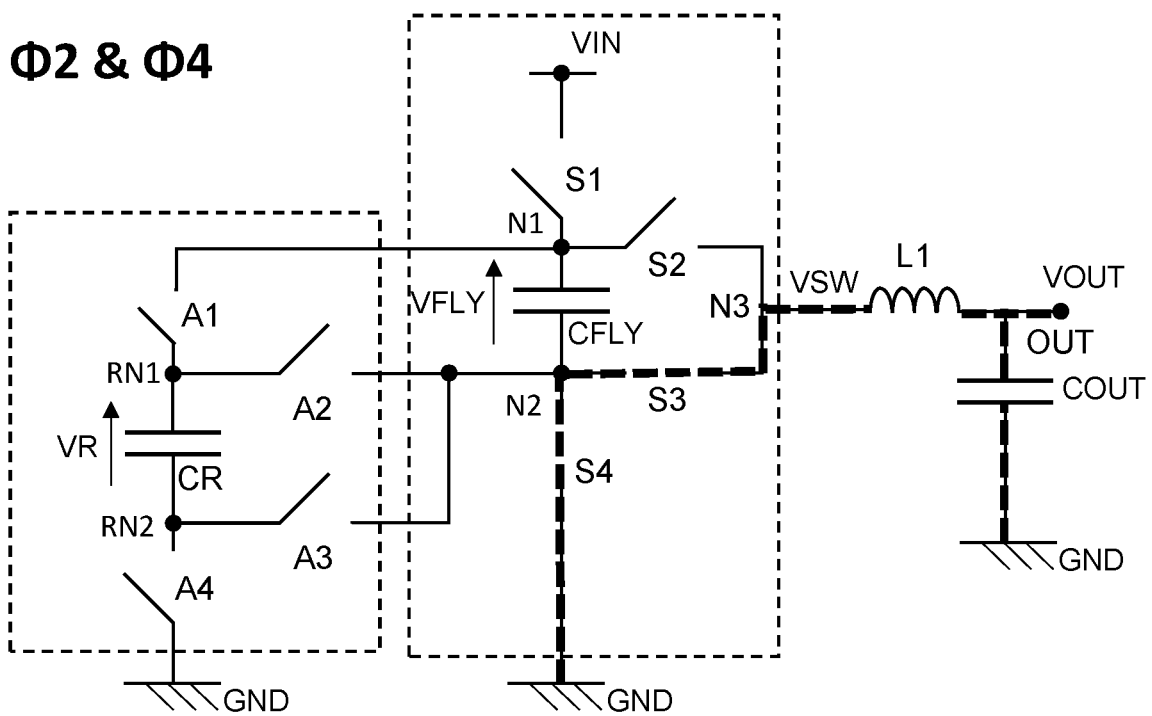

During a second phase shown in FIG. 4C, the third and fourth switches S3, S4 are closed (the remaining switches open), such that the switch node N3 is coupled to ground GND. The flying capacitor CFLY and the reservoir capacitor CR are thus disconnected (floating) and the inductor L1 de-energises to ground GND.

Figure 4D:
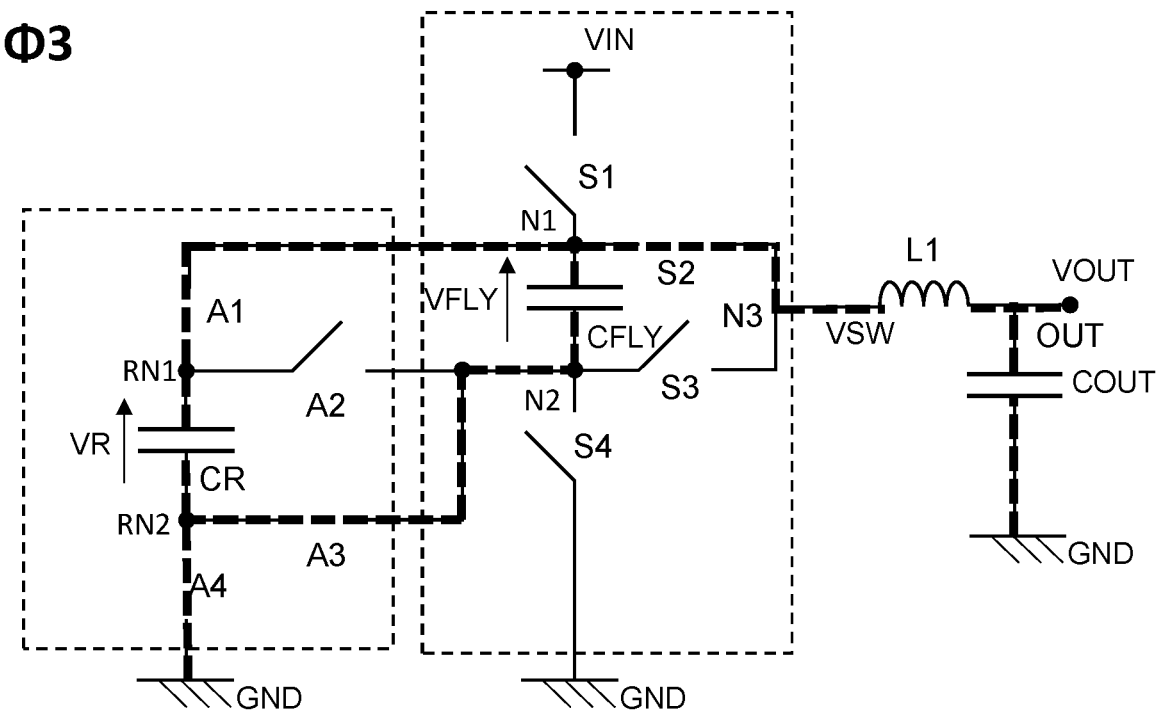

During a third phase shown in FIG. 4D, the second switch S2 and the first, third and fourth reservoir switches A1, A3, A4 are closed (the remaining switches open), such that the reservoir capacitor CR is connected in series with the flying capacitor CFLY, each capacitor CR, CFLY coupled between ground and the switch node N3. As such, the capacitors CR, CFLY discharge, energising the inductor L1. Providing the reservoir capacitor CR in parallel with the flying capacitor CFLY bolsters the overall charge available for discharge to the switch node N3. This has the advantage of reducing ripple in the voltage VFLY across the flying capacitor CFLY. In addition, the charge across the reservoir and flying capacitors CR, CFLY is balanced by connecting them in parallel.

In other embodiments, during this third phase the second reservoir switch A2 may be left open such that the reservoir capacitor CR is left floating (not coupled in parallel with the flying capacitor CFLY). In which case the flying capacitor CFLY alone will discharge energising the inductor L1. Alternatively, during this third phase the fourth reservoir switch A4 may be left open such that the flying capacitor CFLY is left floating (not coupled in parallel with the reservoir capacitor CR). In which case the reservoir capacitor CR alone will discharge energising the inductor L1. In yet another embodiment, the two alternatives discussed above may be implemented in alternating third phases such that during a first third phase the reservoir capacitor CR is configured to discharge and during a second third phase the flying capacitor CFLY is configured to discharge.

During a fourth phase the switches S1:S4, A1:A4 are controlled to return to the configuration shown in FIG. 4C in which the flying capacitor CFLY and the reservoir capacitor CR are thus disconnected (floating) and the inductor L1 de-energises to ground GND.

Thus, the first to fourth phases described above operate to switch the switching node N3 between ground GND and VIN/2.

As the input voltage VIN decreases, to maintain the same output voltage VOUT at the output node OUT, the duty cycle of phases 1 and 3 are increased. This has the effect of reducing the inductor current ripple until a minimum is reached when the input voltage VIN is equal to twice the output voltage VOUT.

When the input voltage VIN decreases to a point at which it is less than twice the output voltage VOUT, the converter 300 is controlled to switch the switch node N3 between VIN and VIN/2. In this mode of operation, the switches are controlled in a different sequence.

Operation of the stabilised three-level buck mode to switch the switch node N3 between VIN/2 and VIN will now be described with reference to FIGS. 5A to 5D. The switches S1:S4, A1:A4 are controlled in four phases as shown in the table in FIG. 5A, again with the aim of stabilising the voltage VFLY across the flying capacitor at VIN/2.

Figures 5A, 5B:
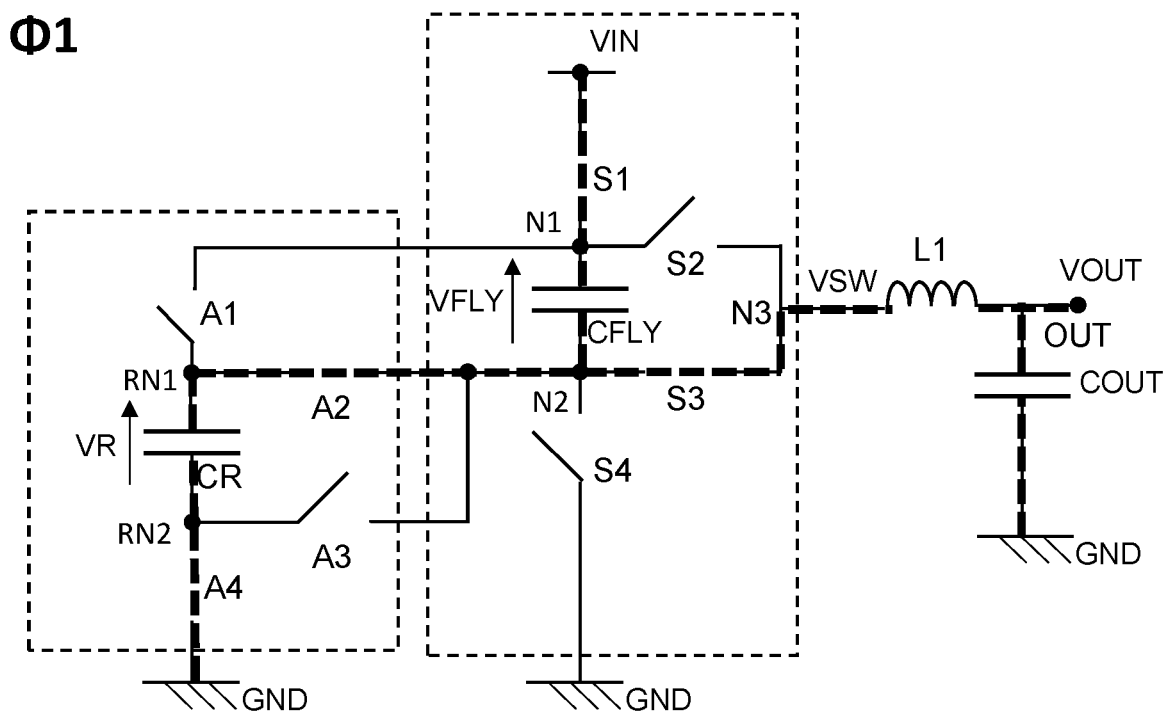
FIG. 5A is a table showing switching operation of the converter of FIG. 3 in a buck mode.
FIGS. 5B to 5D are schematic diagrams illustrating switching configurations denoted in the table in FIG. 5A.

During a first phase shown in FIG. 5B, the first and third switches S1, S3 and the second and fourth reservoir switches A2, A4 are closed (the remaining switches open), such that the flying capacitor CFLY and the reservoir capacitor CR are stacked in series between the input voltage VIN and ground GND. Since the capacitances of the flying capacitor CFLY and the reservoir capacitor CR are substantially equal, the voltage drop across each is equal to VIN/2 and the voltage at the second flying capacitor node FCN2 is thus VIN/2.

Figure 5C:
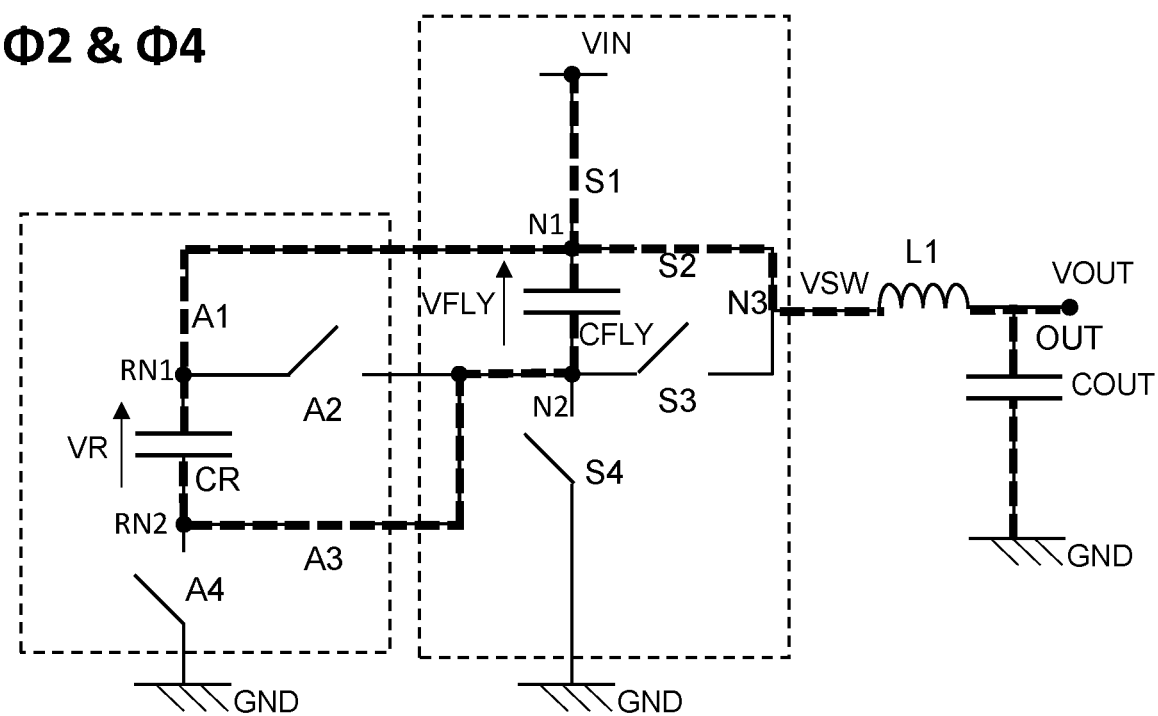

During a second phase shown in FIG. 5C, the first and second switches S1, S2 and the first and third reservoir switches A1, A3 are closed (the remaining switches open). Thus, the input voltage VIN is provided to the switch node N3. The flying capacitor CFLY and the reservoir capacitor CR are disconnected, and the inductor L1 energises to VIN. Closing the first and third reservoir switches A1, A3 balances the charge across these two capacitors CR, CFLY. In other embodiments, during the second phase, the first and third reservoir switches A1, A3 may be left open.

Figure 5D:
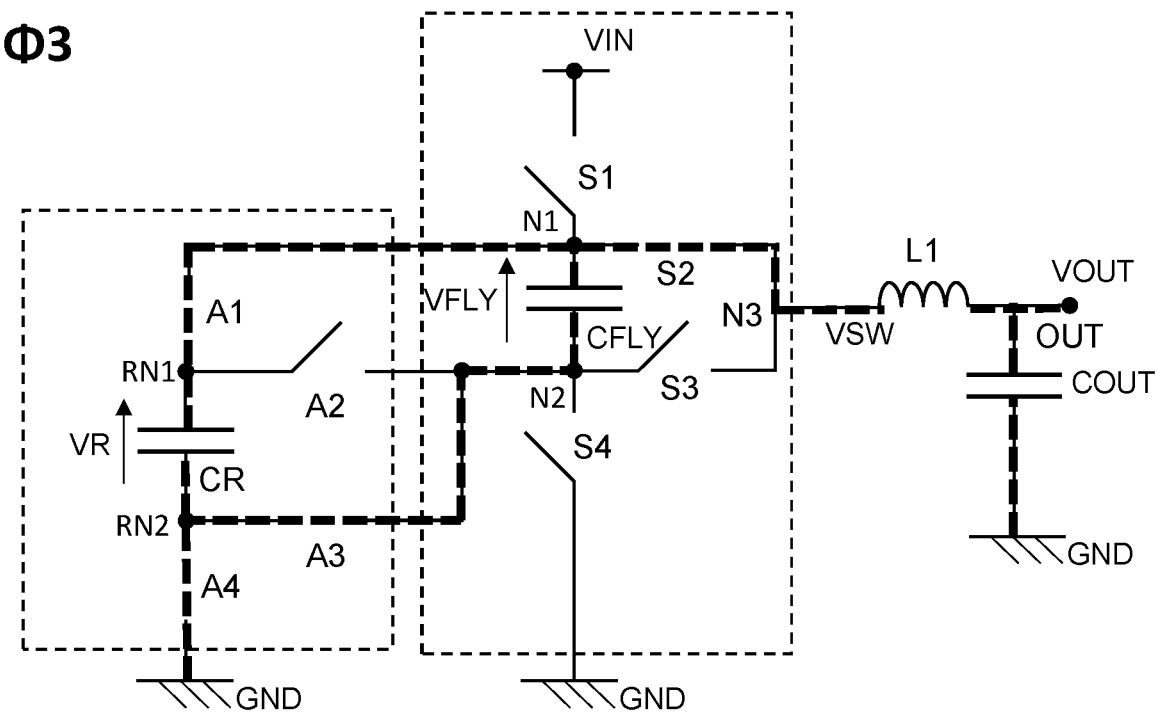

During a third phase shown in FIG. 5D, the second switch S2 and the first, third and fourth reservoir switches A1, A3, A4 are closed (the remaining switches open), such that the reservoir capacitor CR is connected in series with the flying capacitor CFLY, each capacitor CR, CFLY coupled between ground and the switch node N3. As such, the capacitors CR, CFLY discharge, energising the inductor L1. This switch arrangement is similar to that shown in FIG. 4D.

During a fourth phase the switches S1:S4, A1:A4 are controlled to return to the configuration shown in FIG. 5C in which the flying capacitor CFLY and the reservoir capacitor CR are thus disconnected (floating) and the inductor L1 energises to VIN.

Thus, the first to fourth phases described above operate to switch the switching node N3 between ground VIN and VIN/2.

Operation of the bolstered three-level buck mode to switch the switch node N3 between VIN/2 and GND will now be described with reference to FIGS. 6A to 6D. The switches S1:S4, A1:A4 are controlled in four phases as shown in the table in FIG. 6A, with the aim of bolstering the capacitance CFLY using the reservoir capacitor CR during three-level buck operation. Switching with respect to the first, second, third and fourth switches S1:S4 of the switching cell 102 is similar to the switching described with respect of FIGS. 1 and 2 above.

Figures 6A, 6B:
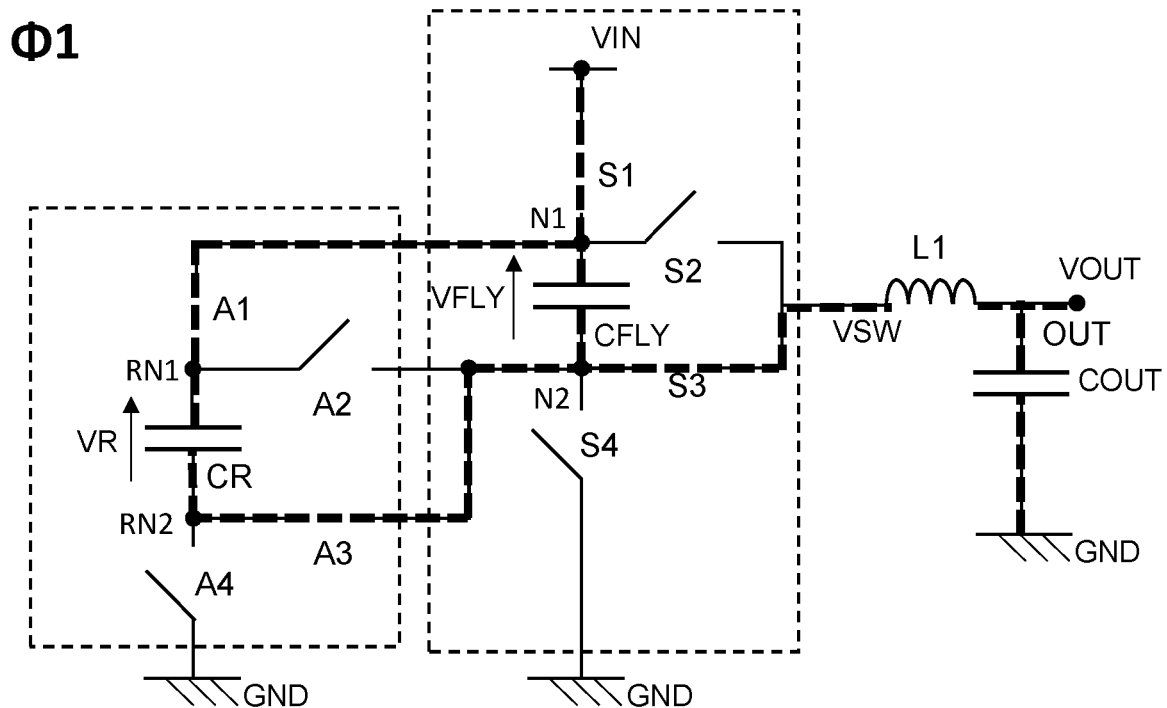
FIG. 6A is a table showing switching operation of the converter of FIG. 3 in a bolster mode.
FIGS. 6B to 6D are schematic diagrams illustrating switching configurations denoted in the table in FIG. 6A.

During a first phase, as shown in FIG. 6B, the first and third switches S1, S3 are closed (and the second and fourth switches open), presenting VIN-VFLY (i.e. VIN/2 assuming CFLY is charged to VIN/2) at the switch node N3. The first and third reservoir switches A1, A3 are closed (and the second and fourth reservoir switches A2, A4 open), such that the reservoir capacitor CR is connecting in parallel to the flying capacitor CFLY. Thus, the reservoir capacitor CR acts to bolster the capacitance of the flying capacitor CFLY. In this phase, the flying capacitor CFLY and the reservoir capacitor are charged whilst the inductor L1 is energised, since the output voltage VOUT is lower than the voltage VSW at the switch node N3.

Figure 6C:
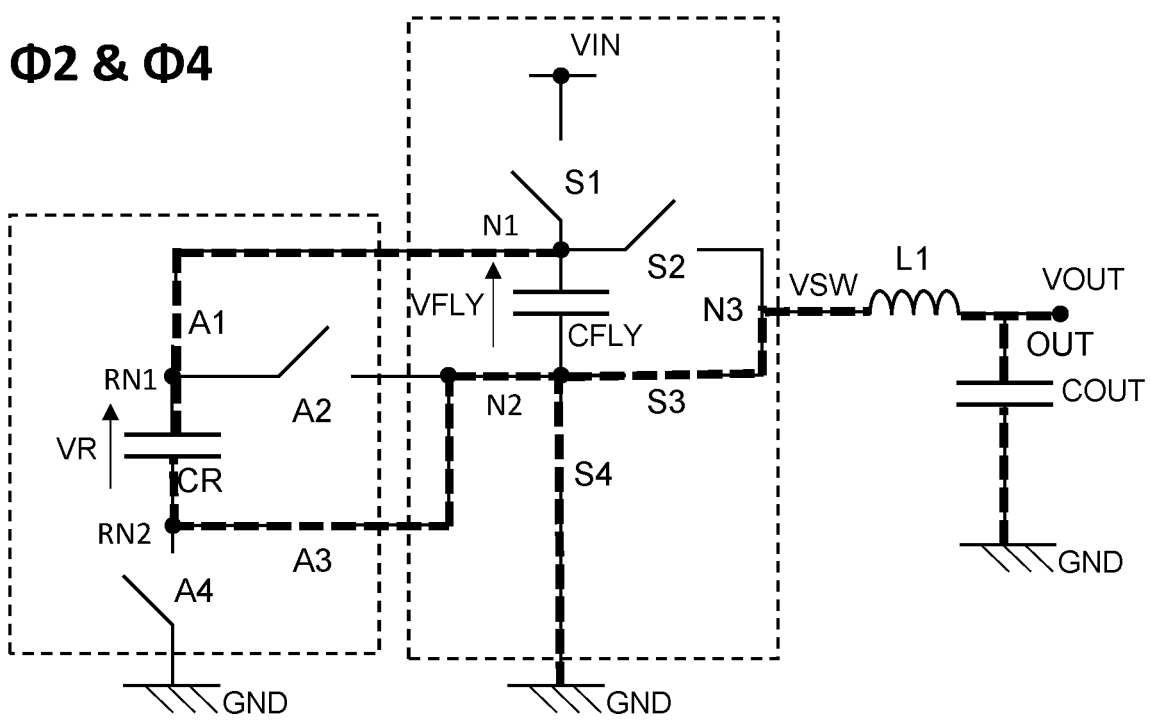

During a second phase as shown in FIG. 6C, the third and fourth switches S3, S4 are closed (the remaining switches open) such that the switch node N3 is coupled to ground GND. The flying capacitor CFLY and reservoir capacitor are thus disconnected and the inductor de-energises to ground GND. Optionally, the first and third reservoir switches A1, A3 remain closed (and the second and fourth reservoir switches A2, A4 open), to enable charge to balance between the reservoir capacitor CR and the flying capacitor CFLY.

Figure 6D:
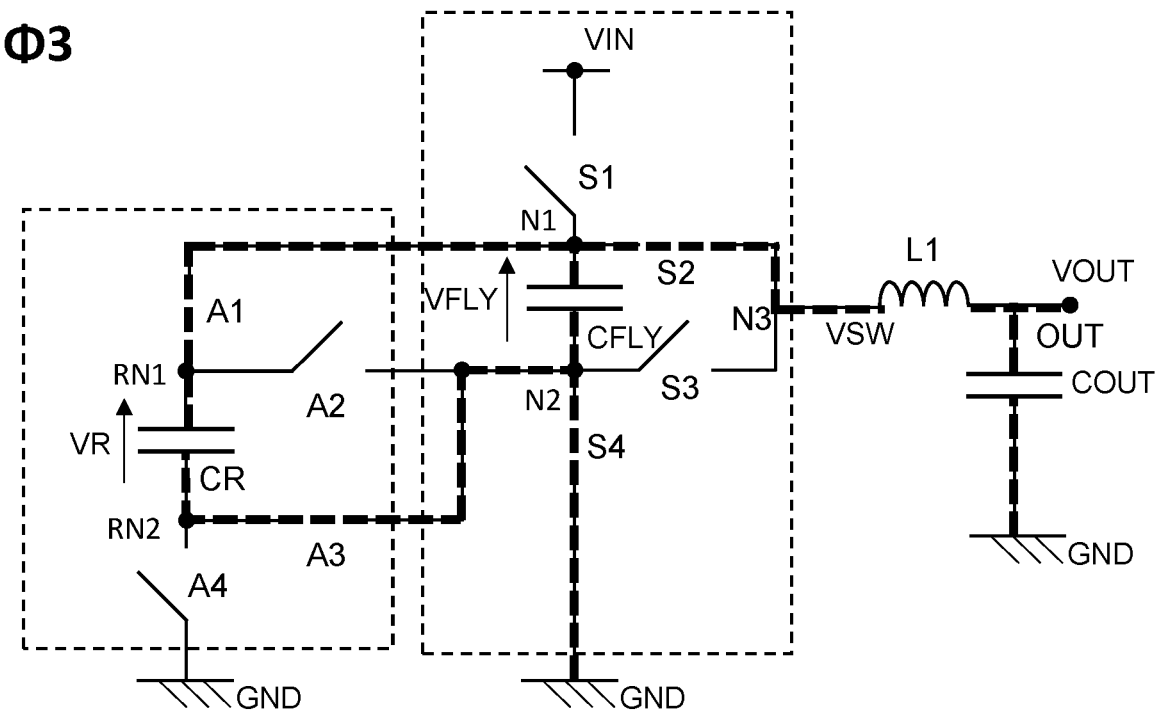

During a third phase as shown in FIG. 6D, the second and fourth switches S2, S4 are closed (and first and third switches S1, S3 open) connecting the flying capacitor CFLY across the switch node N3. The first and third reservoir switches A1, A3 are closed (and the second and fourth reservoir switches A2, A4 open), such that the reservoir capacitor CR is connecting in parallel to the flying capacitor CFLY. Thus, the reservoir capacitor CR acts to bolster the capacitance of the flying capacitor CFLY. The voltage across the flying capacitor CFLY and reservoir capacitor CR thus discharges, energising the inductor L1. In a variation of this third phase, instead of the fourth switch S4 and the fourth reservoir switch A4 being open, the fourth reservoir switch A4 may be closed with the fourth switch S4 being open. In either case, a path is provided to ground GND via the flying capacitor CFLY and the reservoir capacitor CR.

As with the regime described above with reference to FIG. 1, any charge added to the flying capacitor CFLY during the first phase should be removed during the third phase, so as to maintain the balance of charge in the capacitor CFLY and reservoir capacitor CR such that the voltage VFLY across the capacitors CFLY, CR is maintained at VIN/2 in steady state operation. Do to so, the durations of the first and third phases are substantially equal.

During a fourth phase as shown in FIG. 6D, the third and fourth switches S3, S4 are again closed such that the reference voltage (e.g. GND) is provided directly to the inductor L1. This leaves the flying capacitor CFLY disconnected and de-energises the inductor L1. Optionally, the first and third reservoir switches A1, A3 remain closed (and the second and fourth reservoir switches A2, A4 open), to enable charge to balance between the reservoir capacitor CR and the flying capacitor CFLY.

As the input voltage VIN decreases, to maintain the same output voltage VOUT at the output node OUT, the duty cycle of phases 1 and 3 are increased. This has the effect of reducing the inductor current ripple until a minimum is reached when the input voltage VIN is equal to twice the output voltage VOUT.

When the input voltage VIN decreases to a point at which it is less than twice the output voltage VOUT, the converter 300 is controlled to switch the switch node N3 between VIN and VIN/2. In this mode of operation, the switches are controlled in a different sequence as shown in FIG. 7A.

Figures 7A, 7B:
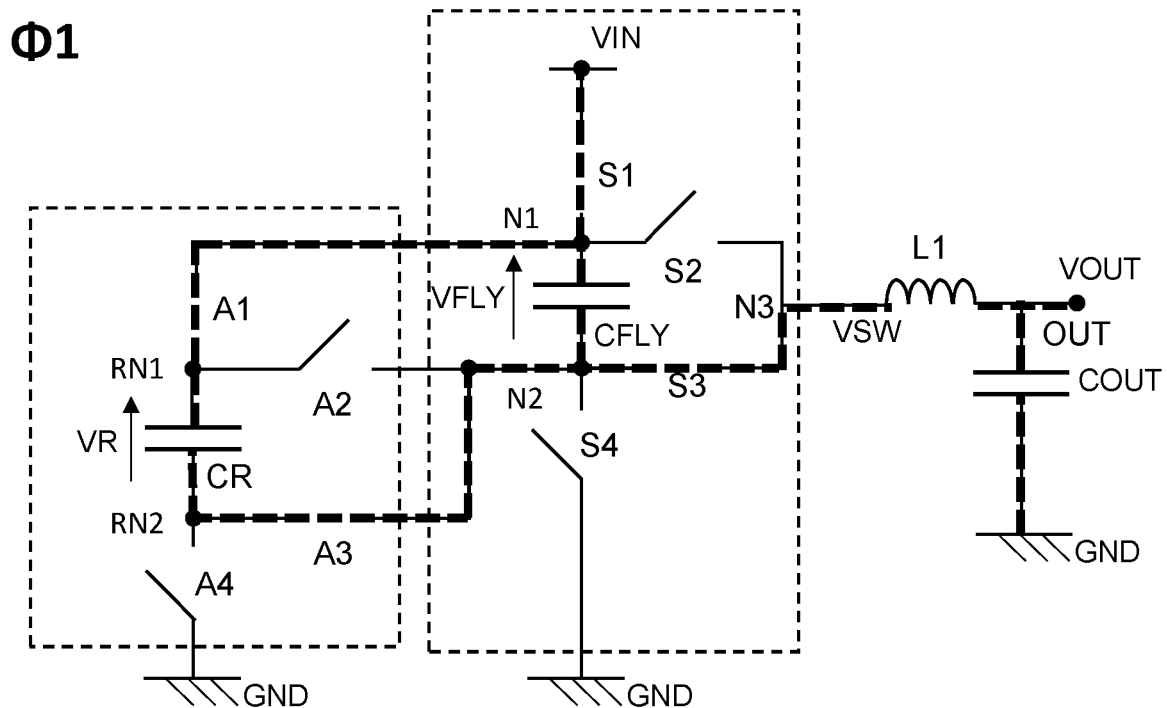
FIG. 7A is a table showing switching operation of the converter of FIG. 3 in a bolster mode.
FIGS. 7B to 7D are schematic diagrams illustrating switching configurations denoted in the table in FIG. 7A.

During a first phase as shown in FIG. 7B, the first and third switches S1, S3 are closed (and the second and fourth switches open), presenting VIN-VFLY (i.e. VIN/2 assuming CFLY and CR are charged to VIN/2) at the switch node N3. The first and third reservoir switches A1, A3 are closed (and the second and fourth reservoir switches A2, A4 open), such that the reservoir capacitor CR is connecting in parallel to the flying capacitor CFLY. Thus, the reservoir capacitor CR acts to bolster the capacitance of the flying capacitor CFLY. The flying capacitor CFLY and the reservoir capacitor CR are charged whilst the inductor L1 is energised, since the output voltage VOUT is lower than the voltage VSW at the switch node N3.

Figure 7C:
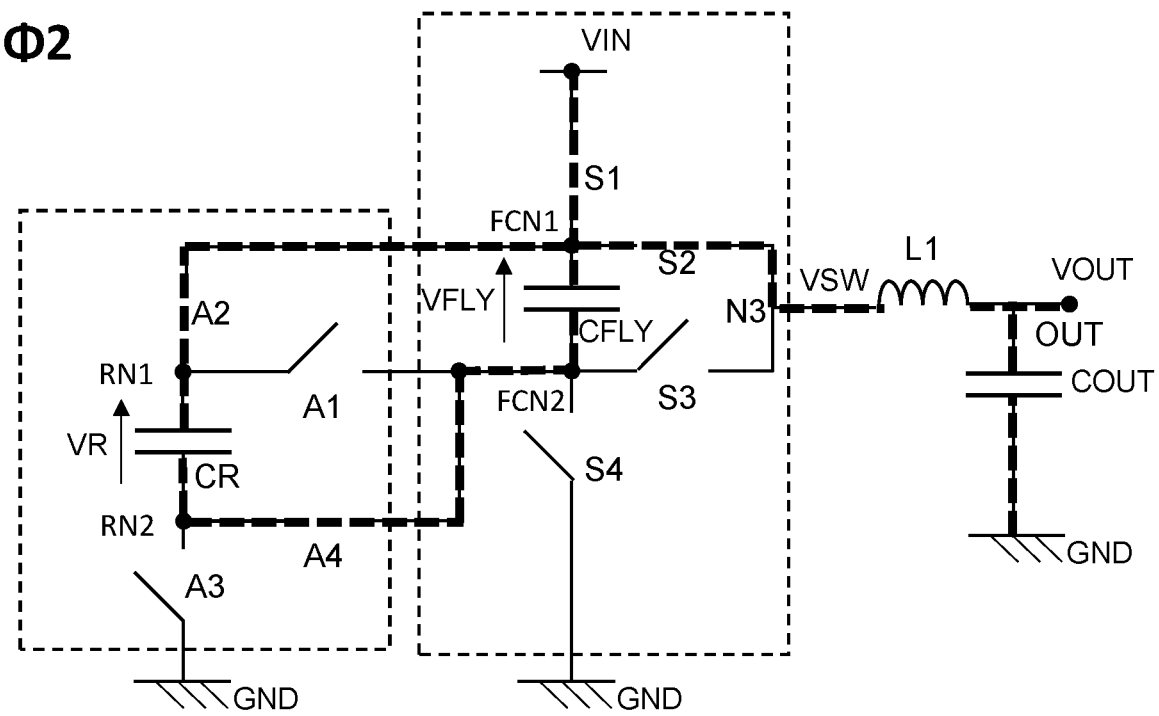

During a second phase as shown in FIG. 7C, the first and second switches S1, S2 are closed (the third and fourth switches S3, S4 open) such that the input voltage VIN is provided to the switch node N3. The flying capacitor CFLY is thus disconnected, and the inductor energises to VIN. Optionally, the first and third reservoir switches A1, A3 remain closed (and the second and fourth reservoir switches A2, A4 open), to enable charge to balance between the reservoir capacitor CR and the flying capacitor CFLY.

Figure 7D:
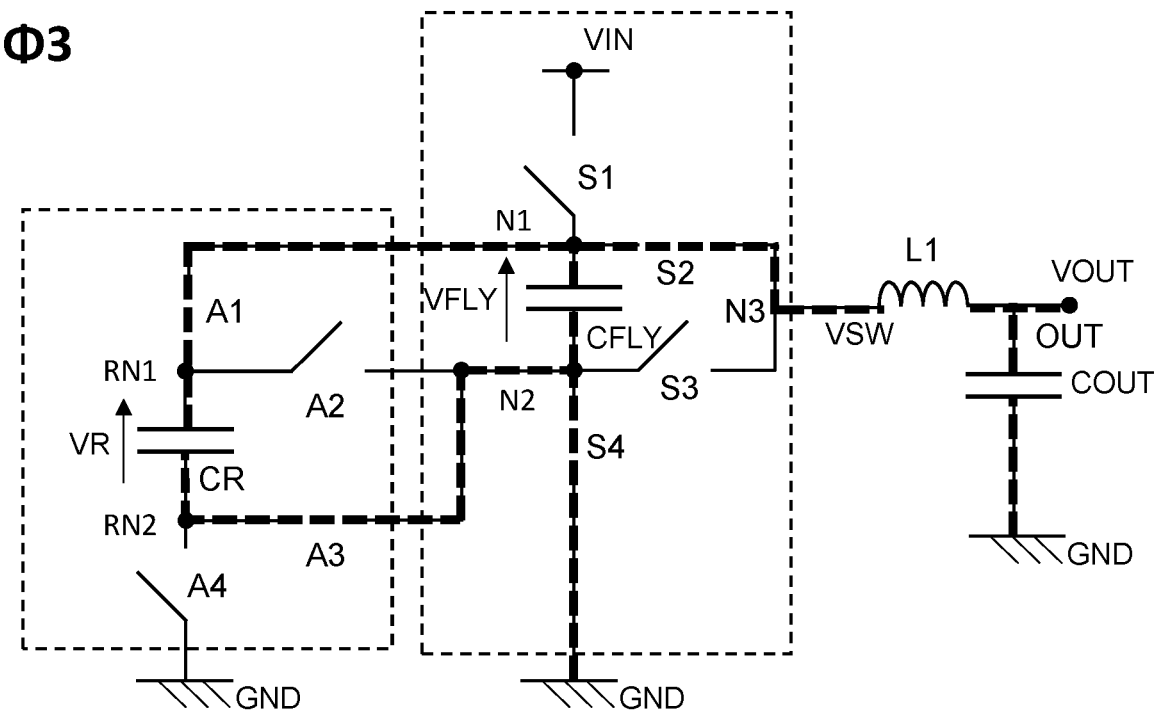

During a third phase as shown in FIG. 7D, the second and fourth switches S2, S4 are closed (and first and third switches S1, S3 open) connecting the flying capacitor CFLY across the switch node N3. The first and third reservoir switches A1, A3 are closed (and the second and fourth reservoir switches A2, A4 open), such that the reservoir capacitor CR is connecting in parallel to the flying capacitor CFLY. Thus, the reservoir capacitor CR acts to bolster the capacitance of the flying capacitor CFLY. Since the voltage across the inductors L1 is greater than the voltage across the flying capacitor CFLY and reservoir capacitor CR, the inductor L1 de-energises via the load, the flying capacitor CFLY and the reservoir capacitor CR.

During a fourth phase as shown in FIG. 7C, the first and second switches S1, S2 are again closed such that the input voltage VIN is provided at the switch node N3. This leaves the flying capacitor CFLY disconnected and energises the inductor L1. Optionally, the first and third reservoir switches A1, A3 remain closed (and the second and fourth reservoir switches A2, A4 open), to enable charge to balance between the reservoir capacitor CR and the flying capacitor CFLY.

Figures 8A, 8B:
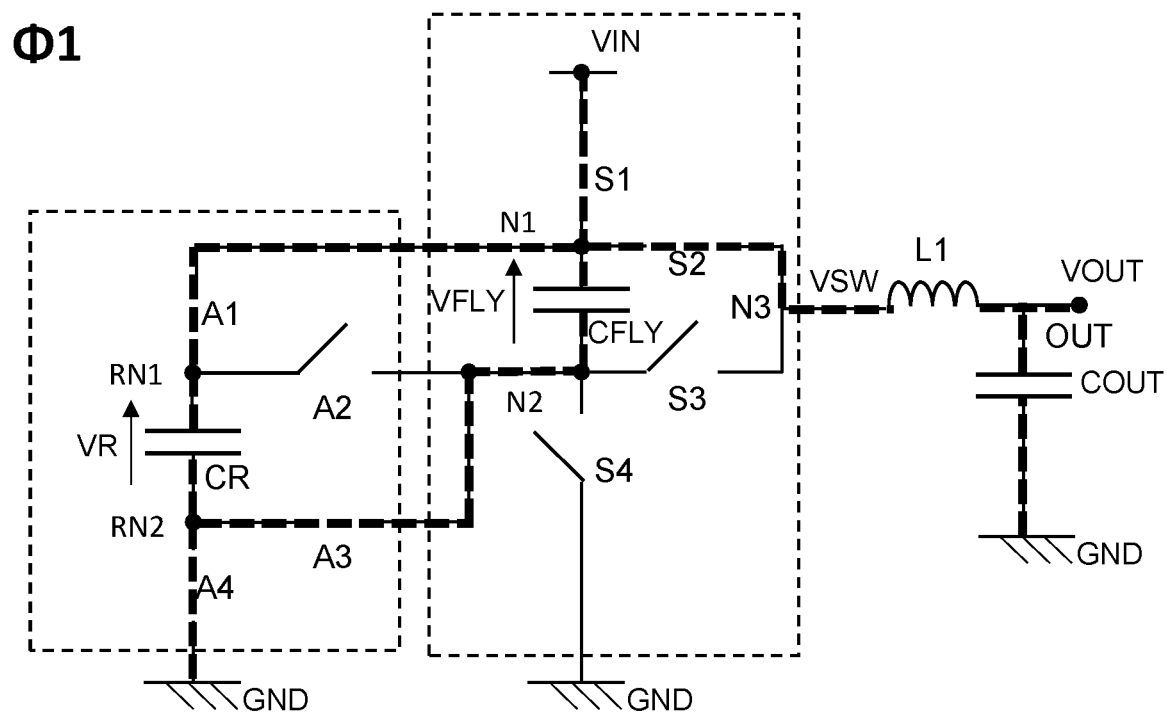
FIG. 8A is a table showing switching operation of the converter of FIG. 3 in a boost mode.
FIGS. 8B and 8C are schematic diagrams illustrating switching configurations denoted in the table in FIG. 8A.

Operation of the two-level boost mode will now be described with reference to FIGS. 8A, 8B, and 8C. In two-level boost mode, the converter 300 is switched in two phases (as opposed to four phases as is the case for buck conversion described above). FIG. 8A is a table showing the switch positions in each phase.

During a first phase, as shown in FIG. 8B, the first and second switches S1, S2 of the switching cell 102 and the first, third and fourth reservoir switches S1, S3, S4 are closed (the remaining switches open). Thus, the reservoir capacitor CR and the flying capacitor CFLY are connected in parallel between VIN and ground GND and therefore each charged to VIN. The switch node N3 is connected to VIN and is thus at VIN.

Figure 8C:
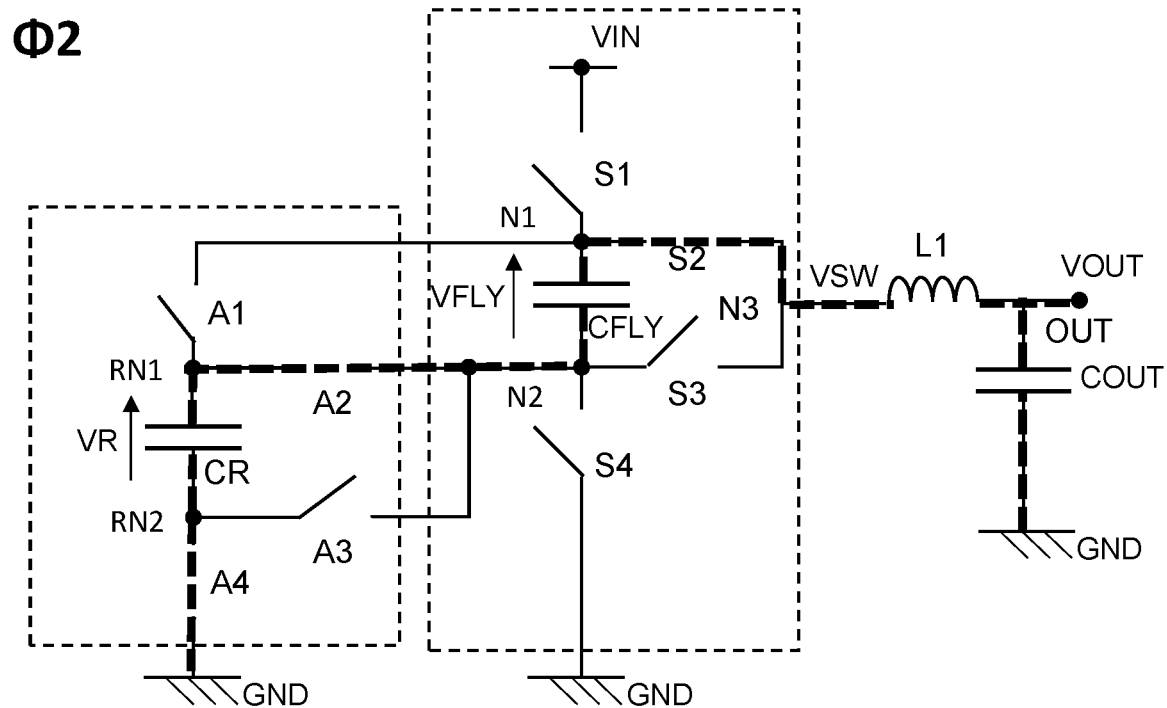

During a second phase, as shown in FIG. 8C, the second switch S2 and the second and fourth reservoir switches A2, A4 are closed (the remaining switches open). As such, the reservoir capacitor CR and the flying capacitor VFLY, each having a voltage VIN across them, are stacked in series between ground and the switch node N3. The voltage VSW at the switch node N3 is thus driven to 2VIN.

In the above example implementation of the three-level bolster buck mode, the first and third reservoir switches A1, A3 are closed (and the second and fourth reservoir switches A1, A4 open) during the first and third phases. It will be appreciated that this configuration of the reservoir switches A1:A4 may be maintained during all four phases without affecting operation in this mode. Doing so may reduce adverse effects associated with transitioning such switches between phases.

In addition to the two-level boost mode described above with reference to FIGS. 8A and 8B, the converter 300 is also capable of operating in a two-phase reverse boost mode, either switching the switch node N3 between ground GND and VIN/2 (using just two phases) or switching the switch node N3 between VIN/2 and VIN (again using two phases).

Figure 9A:
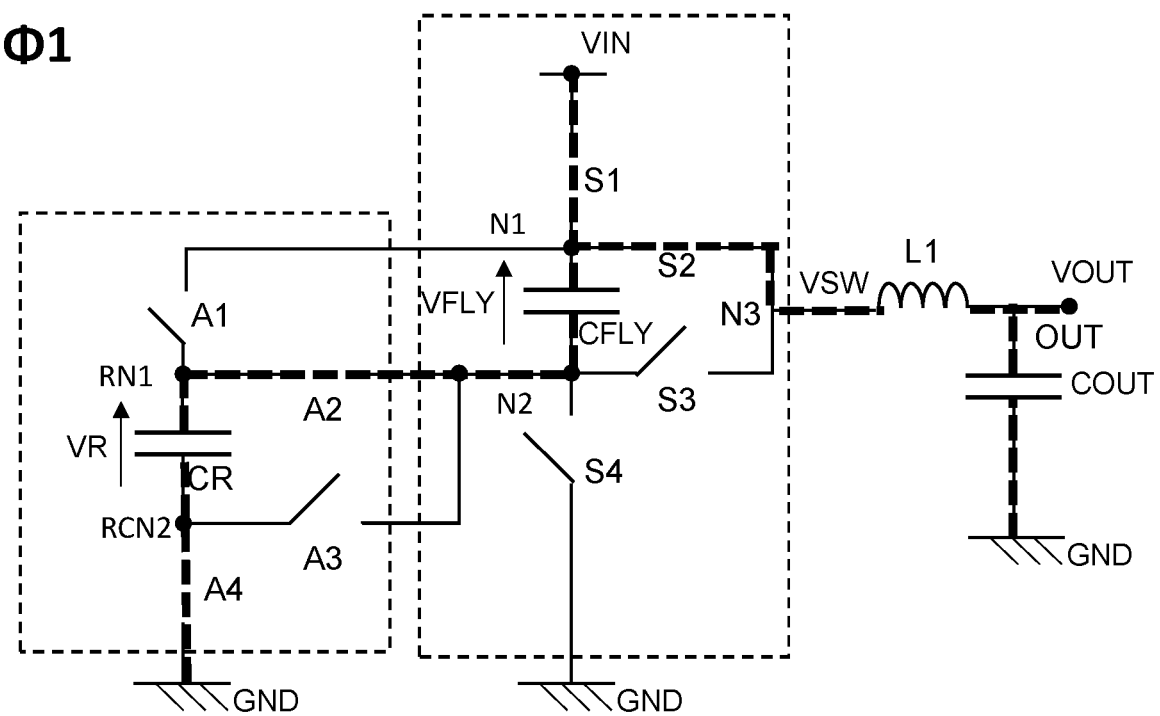
FIGS. 9A and 9B are schematic diagrams illustrating switching configurations during operation of the converter in FIG. 3 in a reverse boost mode.
Figure 9B:
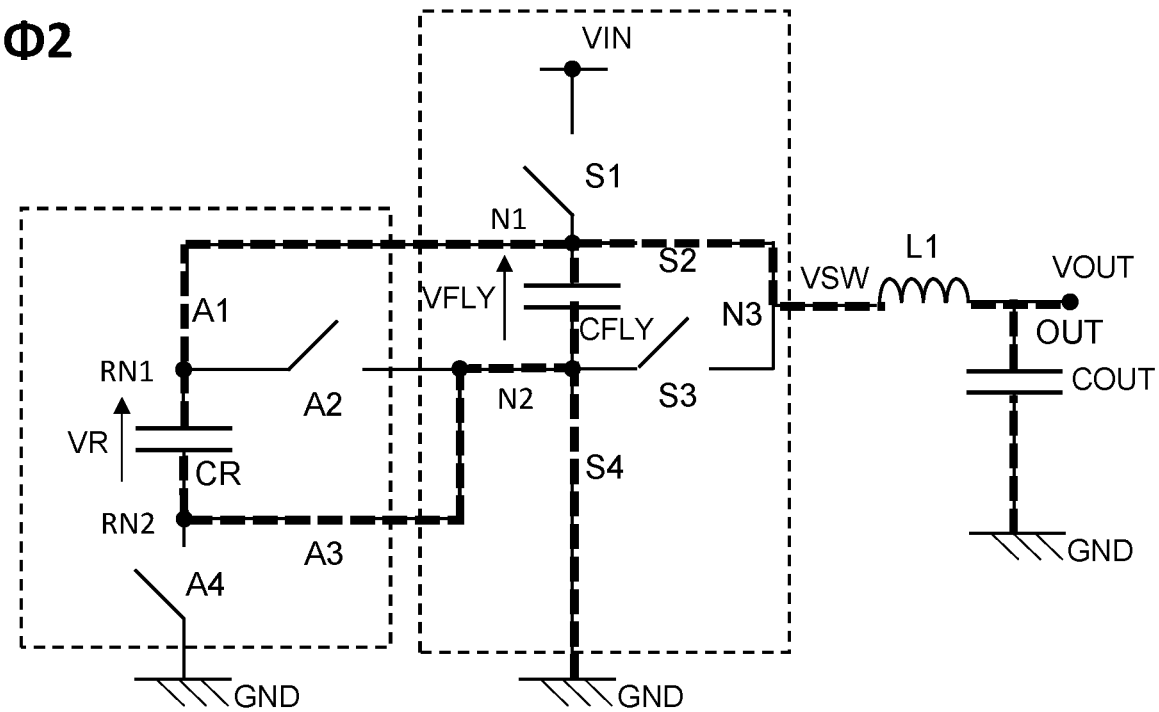

FIGS. 9A and 9B show the two switching phases which may be used for reverse boost operation between VIN/2 and VIN.

During a first phase, as shown in FIG. 9A, the first and second switches S1, S2 and second and fourth reservoir switches A2, A4 are closed (the remaining switches open) such that the reservoir capacitor CR and the flying capacitor CFLY are stacked in series between VIN and ground GND. The reservoir and flying capacitors CR, CFLY are each charged to VIN/2. The switch node N3 is connected to VIN via the first flying capacitor node N1. Thus, the switch node N3 is driven to VIN and the inductor L1 is energised.

During a second phase, as shown in FIG. 9B, the first and fourth switches S1, S4 and the first and third reservoir switches A1, A3 are closed (the remaining switches open), such that the reservoir capacitor CR and the flying capacitor CFLY are connected in parallel, thereby bolstering the overall capacitance and thus charge available to the inductor L1. Since the reservoir and flying capacitors CR, CFLY are charged to VIN/2 (during the first phase), the voltage at the switch node N3 is VIN/2.

Figure 10A:
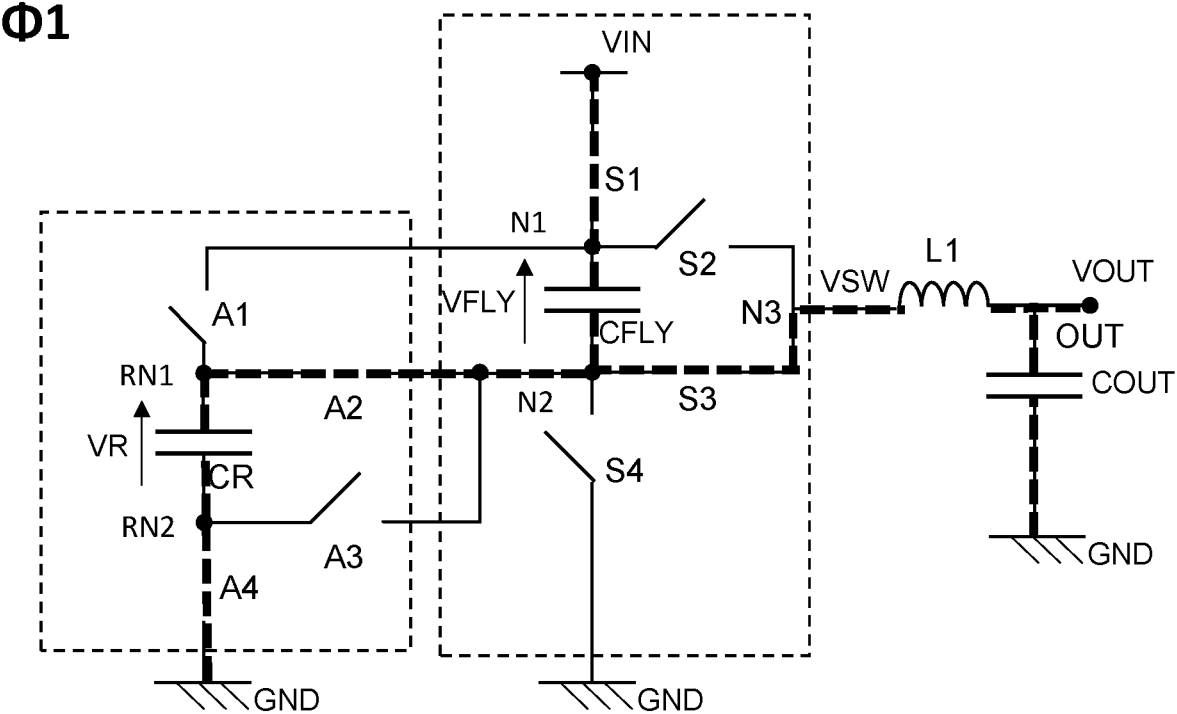
FIGS. 10A and 10B are schematic diagrams illustrating switching configurations during operation of the converter in FIG. 3 in a reverse boost mode.
Figure 10B:
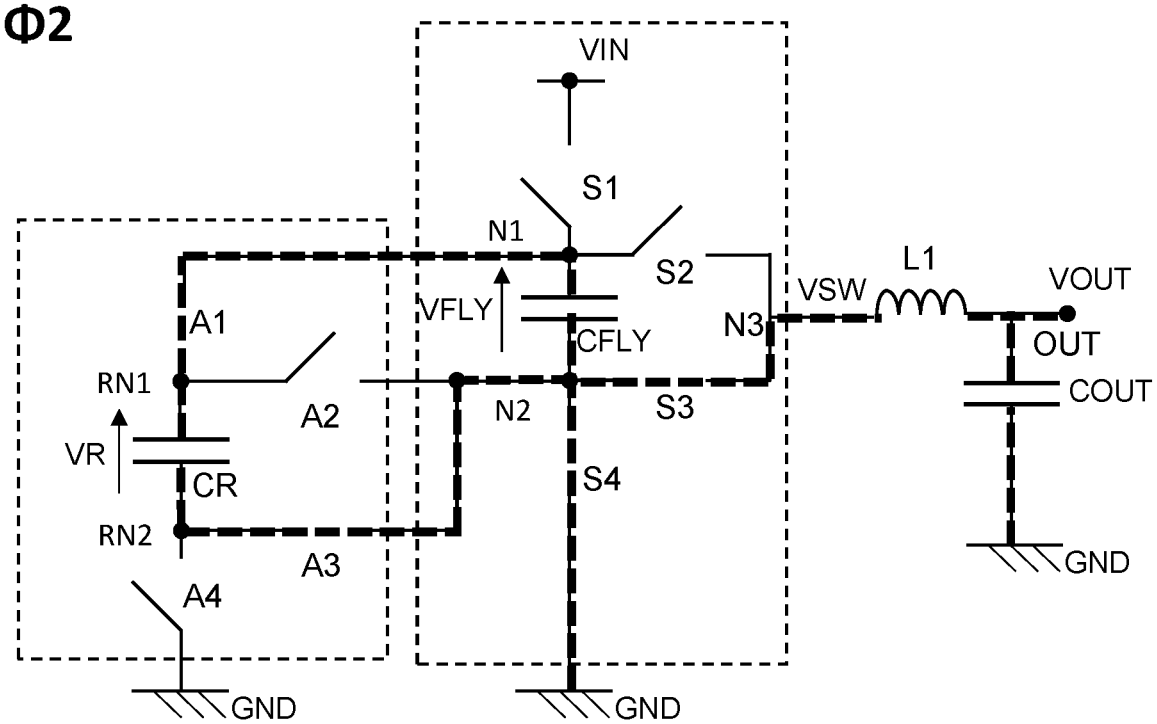

FIGS. 10A and 10B show the two switching phases which may be used for reverse boost operation between VIN/2 and ground GND.

During a first phase, as shown in FIG. 10A, the first and third switches S1, S2 and second and fourth reservoir switches A2, A4 are closed (the remaining switches open) such that the reservoir capacitor CR and the flying capacitor CFLY are stacked in series between VIN and ground GND. The reservoir and flying capacitors CR, CFLY are each charged to VIN/2. The switch node N3 is connected to the first reservoir capacitor node RN1 via the second flying capacitor node N2. Thus, the switch node N3 is driven to VIN/2.

During a second phase, as shown in FIG. 10B, the third and fourth switches S1, S4 and the first and third reservoir switches A1, A3 are closed (the remaining switches open). The switch node N3 is connected to ground GND. The reservoir capacitor CR and the flying capacitor CFLY are connected in parallel enabling charge balancing therebetween.

Figures 11A, 11B, 11C:
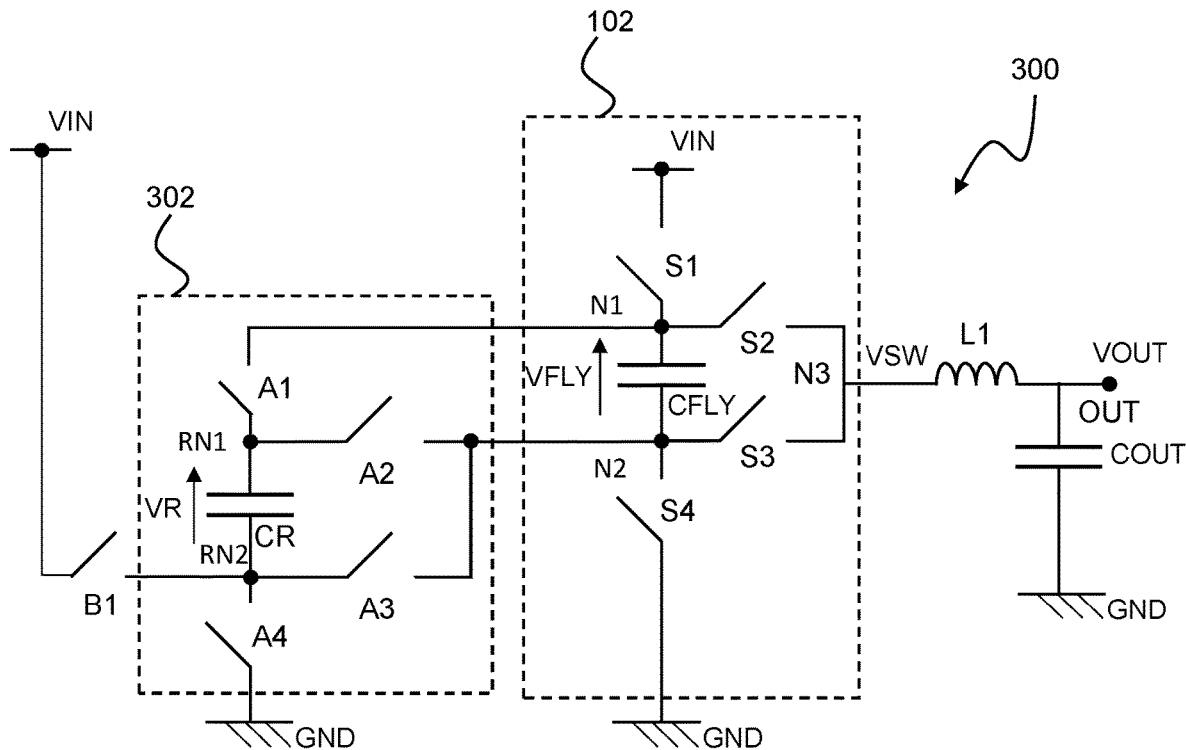
FIG. 11A is a circuit diagram of a converter which is a variation of the converter shown in FIG. 3.
FIGS. 11B to 11D are tables showing switching operation of the converter of FIG. 11A.

FIG. 11A is a converter 1100 which is a variation of the converter 300 described above, where like parts have been given like reference numerals. Differing from the converter 300, the converter 1100 is provided with an additional mode switch B1 configured to enable additional modes in which the switch node N3 may be switched between smaller voltage ranges.

FIGS. 11B and 11C provide two exemplary four-phase switching regimes for the converter 1100 shown in FIG. 11A.

FIG. 11B illustrates a switching scheme for operating the converter 1100 in a boost mode between VIN and 1.5 VIN.

During a first phase, the first and second switches S1, S2 and the second and fourth reservoir switches A2, A4 are closed (the remaining switches open) such that the reservoir capacitor CR and the flying capacitor CFLY are stacked in series between VIN and ground GND. The reservoir and flying capacitors CR, CFLY are each charged to VIN/2. The switch node N3 is connected to VIN via the first flying capacitor node N1. Thus, the switch node N3 is driven to VIN and the inductor L1 is energised.

During a second phase, the first and second switches S1, S2 and the first and third reservoir switches A1, A3 are closed (the remaining switches open). The switch node N3 is maintained at VIN via the first flying capacitor node N1. The reservoir capacitor CR and the flying capacitor CFLY are connected in parallel and thus charge balancing occurs between the two capacitors CR, CFLY.

During a third phase, the second switch S2, the first reservoir switch A1 and the mode switch B1 are closed (the remaining switches open). The switch node N3 is driven by the input voltage VIN plus the voltage across the reservoir capacitor CR (VIN/2) so the voltage VSW at the switch node N3 is driven to 1.5VIN.

During the fourth phase, the switches return to the same state as the second phase, the switch node N3 driven to VIN.

Thus, the switch node N3 is driven between VIN and 1.5VIN.

FIG. 11C illustrates an alternative switching scheme to that shown in FIG. 11B, also for operating the converter 1100 in a boost mode between VIN and 1.5 VIN.

During a first phase, the first and second switches S1, S2 and the second and fourth reservoir switches A2, A4 are closed (the remaining switches open) such that the reservoir capacitor CR and the flying capacitor CFLY are stacked in series between VIN and ground GND. The reservoir and flying capacitors CR, CFLY are each charged to VIN/2. The switch node N3 is connected to VIN via the first flying capacitor node N1. Thus, the switch node N3 is driven to VIN and the inductor L1 is energised.

During a second phase, the first and second switches S1, S2 and the first and third reservoir switches A1, A3 are closed (the remaining switches open). The switch node N3 is maintained at VIN via the first flying capacitor node N1. The reservoir capacitor CR and the flying capacitor CFLY are connected in parallel and thus charge balancing occurs between the two capacitors CR, CFLY.

During a third phase, the second switch S2 is closed in addition to the first and third reservoir switches A1, A3 and the mode switch B1 (the remaining switches open). The switch node N3 is driven by the input voltage VIN plus the voltage across the reservoir capacitor CR (VIN/2) and the flying capacitor CFLY (VIN/2) so the voltage VSW at the switch node N3 is driven to 1.5VIN. Since the reservoir capacitor CR and the flying capacitor CFLY are connected in parallel between VIN and the switch node N3, twice the charge storage is available when compared to just one of the reservoir and flying capacitors CR, CFLY being coupled to the switch node N3.

During the fourth phase, the switches remain in the same state as the third phase, the reservoir and flying capacitors continuing to discharge to the switch node N3 maintaining the switch voltage VSW and 1.5VIN. By maintaining the switches in the same state in the fourth phase as the third phase, fewer transitions of the switches take place, improving overall efficiency of operation of the converter 300.

In a variation of the above, instead of maintaining the first and third reservoir switches A1, A3 closed during the third and fourth phases, in the third phase the first reservoir switch A1 may be closed (the third reservoir switch A3) open and in the fourth phase the second reservoir switch A1 may be closed (the first reservoir switch A3) open. In doing so, charge is supplied to the switch node N3 by the reservoir capacitor CR during the third phase and the flying capacitor CFLY during the fourth phase. In yet a further variation, in the fourth phase the first reservoir switch A1 may be closed (the third reservoir switch A3) open and in the third phase the second reservoir switch A1 may be closed (the first reservoir switch A3) open. In doing so, charge is supplied to the switch node N3 by the flying capacitor CFLY during the third phase and the reservoir capacitor CR during the fourth phase.

Figures 11D, 12:
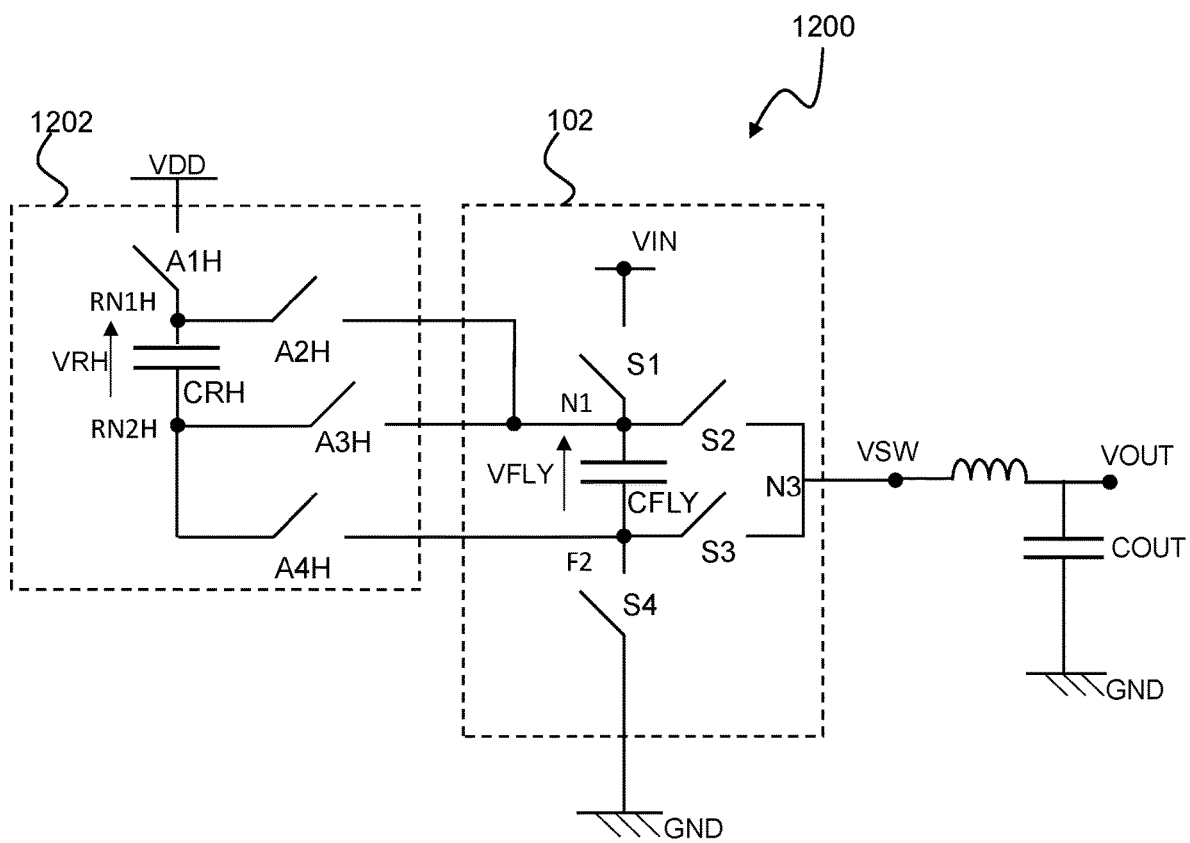
FIG. 12 is a circuit diagram of a converter which is a variation of the converter shown in FIG. 3.

FIG. 11D illustrates a switching scheme for operating the converter 1100 in a boost mode between 1.5VIN and 2VIN.

During a first phase, the first and second switches S1, S2 and the second and fourth reservoir switches A2, A4 are closed (the remaining switches open) such that the reservoir capacitor CR and the flying capacitor CFLY are stacked in series between VIN and ground GND. The reservoir and flying capacitors CR, CFLY are each charged to VIN/2. The switch node N3 is connected to VIN via the first flying capacitor node N1. Thus, the switch node N3 is driven to VIN and the inductor L1 is energised.

During a second phase, the second switch S2, the first reservoir switch A1 and the mode switch B1 are closed (the remaining switches open). The switch node N3 is driven by the combination of the input voltage VIN and the voltage across the reservoir capacitor CR (VIN/2), so the switch voltage VSW is driven to 1.5VIN.

During a third phase, the third switch S3, the first reservoir switch A1 and the mode switch B1 are closed (the remaining switches open). The switch node N3 is driven by the input voltage VIN plus the voltage across the reservoir capacitor CR (VIN/2) plus the voltage across the flying capacitor VFLY (VIN/2) so the voltage VSW at the switch node N3 is driven to 2VIN.

During the fourth phase, the switches return to the same state as the second phase, the switch node N3 driven to 1.5VIN.

FIG. 12 is a circuit diagram of a converter 1200 which is a high side variant of the converter 300 described above. The converter 1200 comprises the switching cell 102 described above with reference to FIG. 1 and so like parts of that cell 102 have been provided with like reference numerals. Specifically, the converter 1200 comprises first, second, third and fourth switches S1, S2, S3, S4 in addition to the flying capacitor CFLY. The converter 1200 may further comprise the inductor L1 coupled to the switching node VSW and the smoothing capacitor COUT coupled to the output node VOUT in a similar arrangement to that shown in FIG. 1.

In addition to the switching cell 102, the converter 1200 further comprises reservoir circuitry 1202 comprising first, second, third and fourth reservoir switches A1H, A2H, A3H, A4H in addition to a reservoir capacitor CRH. The reservoir switches A1H, A2H, A3H, A4H and the reservoir capacitor CRH are arranged with respect to one another in a similar manner to the switching cell 102. The reservoir capacitor CRH is coupled between first and second reservoir capacitor nodes RN1H, RN2H. The first reservoir switch A1H is configured to selectively connect the first reservoir capacitor node RN1H to a high side reference voltage, in this case VDD. In other embodiments the voltage reference may be at a voltage other than VDD. The second reservoir switch A2H is configured to selectively connect the first reservoir capacitor node RN1H to the first flying capacitor node N1. The third reservoir switch A3H is configured to selectively connect the second reservoir capacitor node RN2H to the first flying capacitor node N1. The fourth reservoir switch A4H is configured to selectively connect the second reservoir capacitor node RN2H to the second flying capacitor node N2.

The skilled person will appreciate that the converter 1200 may be operated in a complimentary manner to the converter 300 described above since, instead of selectively coupling nodes of the flying capacitor CFLY and reservoir capacitor CR to VIN and ground GND, the reservoir circuitry 1202 is configured to selectively coupled nodes of the flying capacitor CFLY to the VIN and VDD.

Figure 13:
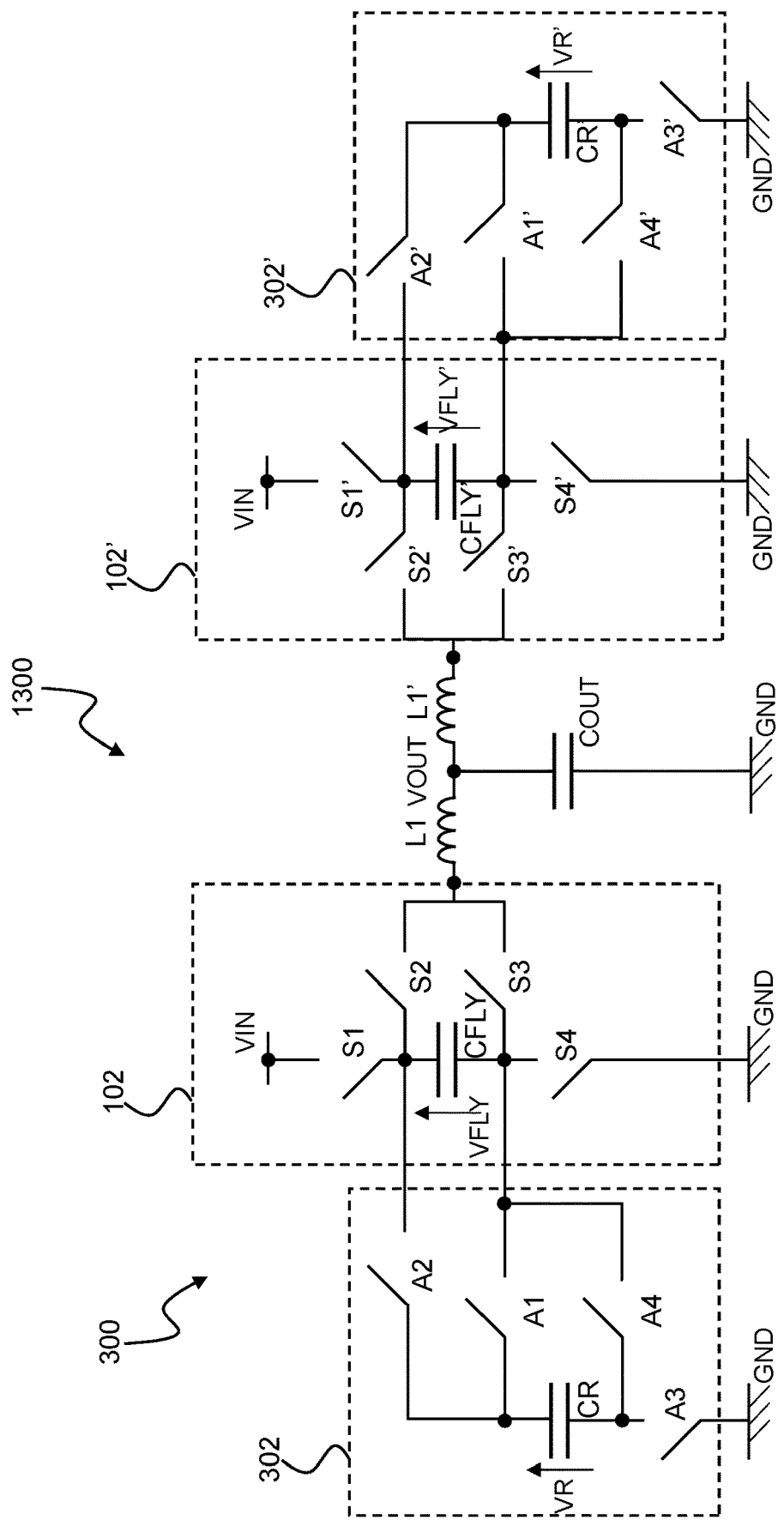
FIG. 13 is a circuit diagram of a converter according to embodiments of the present disclosure.

FIG. 13 is a circuit diagram of a multiphase converter 1300 which incorporates the converter 300 shown above. The converter 1300 comprises the converter 300 coupled to the output node OUT in addition to an additional converter 300' which is substantially identical to the converter 300, also coupled to the common output node OUT. For simplicity, similar parts of the converter 300' are denoted in FIG. 13 with the similar reference numerals concatenated with an apostrophe ('), e.g. CR' for the reservoir capacitor CR' of the additional converter 300'.

Figure 14:
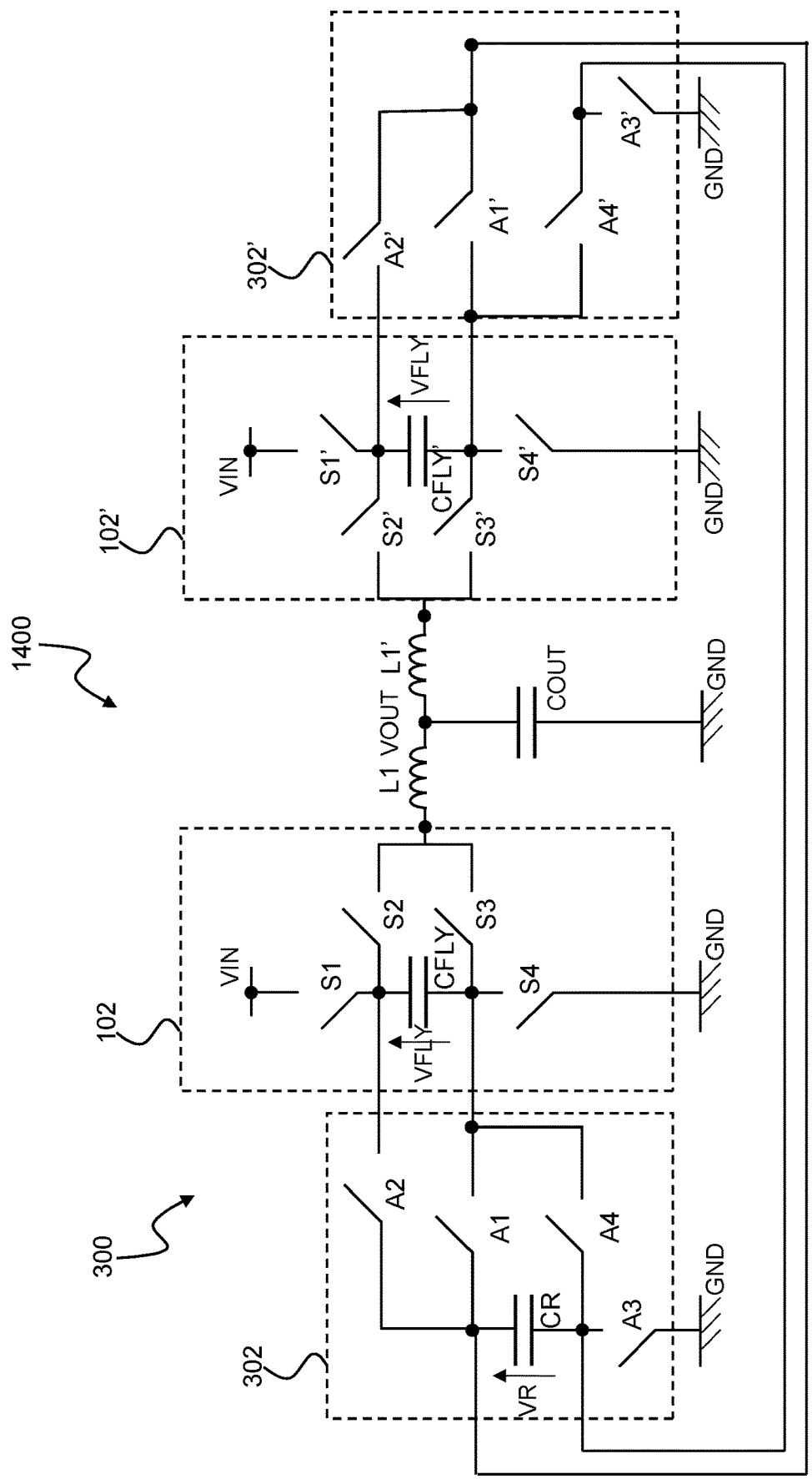
FIG. 14 is a circuit diagram of a converter which is a variation of the converter shown in FIG. 3.

FIG. 14 is a circuit diagram of a multiphase converter 1400 which is a variation of the multiphase converter 1300, different only in that instead of each converter comprising a respective reservoir capacitor CR, CR', a single reservoir capacitor CR is shared between the converter 300 and the additional converter 300'.

In either of the embodiments 1300, 1400 shown in FIGS. 13 and 14, each converter 300, 300' may be controlled such that switching between the two phases is delayed, such that ripple in the output voltage VOUT is reduced or minimized. This is particularly advantageous when the reservoir capacitor CR is being shared between the converter 300 and the additional converter 300', as is the case for the multiphase converter 1400.

FIG. 15 is a table showing an exemplary switching regime for either of the multiphase converters 1300, 1400 for operation in three level stabilised buck mode where VOUT is controlled between ground GND and VIN/2. It can be seen that switches S1:S4 and reservoir switches A1:A4 of the converter 300 are controlled in a similar manner to the converter 300 (as shown in FIG. 4A). In contrast, switching of the additional converter 300' is delayed by a single phase so as to stagger switching such that the reservoir capacitor CR can be shared. Similar staggering can be implemented for three level stabilised buck mode between VIN/2 and VIN.

FIG. 16 is a table showing a similar staggered switching regime to that shown in FIG. 15 but for bolstered three-level buck mode switching between VIN/2 and GND (equivalent to FIG. 6A). Similar staggering can be implemented for three level stabilised buck mode between VIN/2 and VIN.

FIG. 17 is a table showing a similar staggered switching regime to that shown in FIGS. 15 and 16 but for two-level boost mode switching between VIN and 2VIN (equivalent to FIG. 8A).

Figures 18A, 18B:
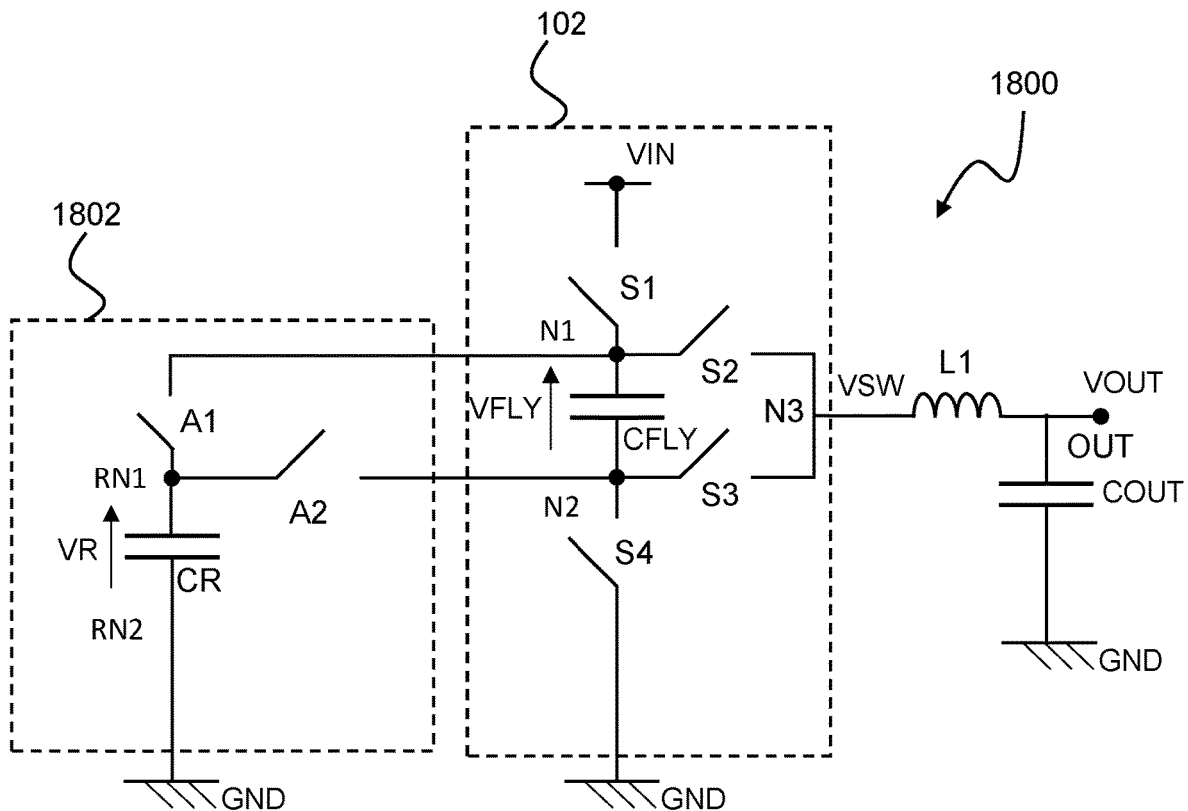
FIG. 18A is a circuit diagram of a converter according to embodiments of the present disclosure.
FIG. 18B is a table showing switching operation of the converter of FIG. 18A.

FIG. 18A is a circuit diagram of a converter 1800 which is a variation of the converter 300. The converter 1800 comprises reservoir circuitry 1802 which differs from the reservoir circuitry 302 of the converter 300 in that the third and fourth reservoir switches have been removed and the second reservoir node RN2 is permanently connected to ground GND. Whilst this converter 1800 has reduced functionality when compared with the converter 300, the converter 1800 is capable of operating in a two-level boost mode.

FIG. 18B is a table showing an example switching regime for the converter 1800.

During a first phase, the first, third and fourth switches S1, S3, S4 and the first reservoir switches are closed (the remaining switches open). Thus, VIN is provided to the switch node N3 and the flying and reservoir capacitors CFLY, CR are charged to VIN.

During a second phase, the second switch S2 and the second reservoir switch S2 is closed (the remaining switches open). Thus, the reservoir and flying capacitors CFLY, CR are stacked in series, providing a combined voltage of 2VIN at the switch node N3.

Thus, the converter 1800 operates to switch the switch node N3 between VIN and 2VIN.

Figure 19:
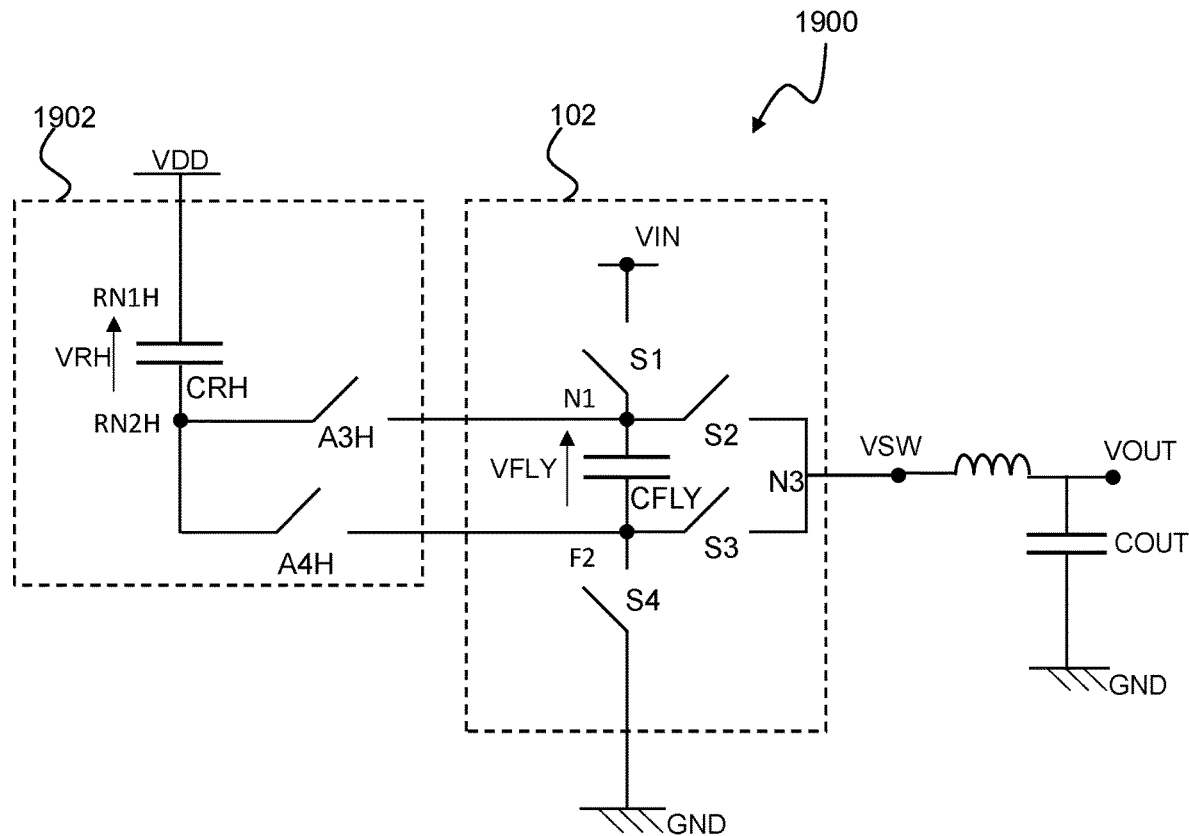
FIG. 19 is a circuit diagram of a converter according to embodiments of the present disclosure.

FIG. 19 is a circuit diagram of a converter 1900 which is a variation of the high side variant converter 1200. The converter 1900 comprises reservoir circuitry 1902 which differs from the reservoir circuitry 1202 of the converter 1200 in that the first and second reservoir switches A1H, A2H have been removed and the first reservoir node RN2H is permanently connected to ground GND. Whilst this converter 1900 has reduced functionality when compared with the converter 300, the converter 1900 is capable of operating in a two-level boost mode, like the converter 1800 shown above.

Figure 20:
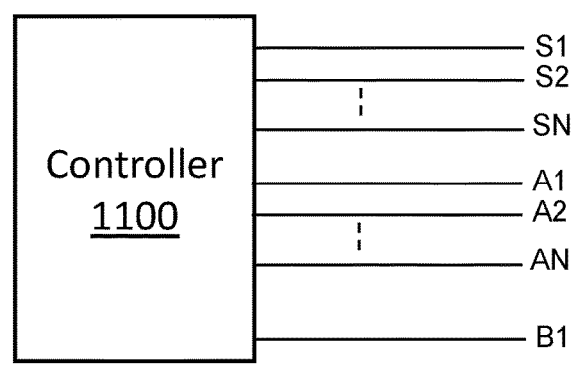
FIG. 20 is a block diagram of a controller for controlling any one of the converters described herein.

In the above explanation of the operation of the switching cell 102 and the converters 300, 1200, 1300, 1400, 1800, 1900 the various switches are controlled to achieve a desired output voltage VOUT based on an input voltage VIN. Such control may be implemented by a controller, such as the controller 2000 shown in FIG. 20 which may be configured to control N switches S1:SN, N switch A1:AN and/or the mode switch B1 in one or more of the regimes described above.

Note that as used herein the term module shall be used to refer to a functional unit or block which may be implemented at least partly by dedicated hardware components such as custom defined circuitry and/or at least partly be implemented by one or more software processors or appropriate code running on a suitable general-purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote-control device, a home automation controller or a domestic appliance including a domestic temperature or lighting control system, a toy, a machine such as a robot, an audio player, a video player, or a mobile telephone for example a smartphone.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A DC-DC converter for converting an input voltage at an input node, the converter comprising:
   first and second inductor nodes for connection of an inductor therebetween;
   first and second flying capacitor nodes for connection of a flying capacitor therebetween;
   a first switching network for selectively connecting the first flying capacitor node to each of the input node and the first inductor node;
   a second switching network for selectively connecting the second flying capacitor node to each of the input node and a reference voltage node; and
   reservoir circuitry, comprising:
       first and second reservoir capacitor nodes for connection of a reservoir capacitor therebetween;
       a third switching network for selectively connecting the first reservoir capacitor node to each of the first and second flying capacitor nodes;
       a fourth switching network for selectively connecting the second reservoir capacitor node to each of the second flying capacitor node and the reference voltage node; and
   control circuitry;
   wherein during a first phase of a stabilization mode, the control circuitry is operable to control the third and fourth switching networks to connect the reservoir capacitor and the flying capacitor in series; and wherein during a second phase of the stabilization mode the control circuitry is operable to control the third and fourth switching networks to connect the reservoir capacitor and the flying capacitor in parallel.

2. The DC-DC converter of claim 1, wherein the control circuitry is configured to control the first and second, switching networks.

3. The DC-DC converter of claim 1, wherein the control circuitry is operable in a bolster mode to control the third and fourth switching networks to connect the reservoir capacitor in parallel with the flying capacitor for a duration of the bolster mode.

4. The DC-DC converter of claim 3, wherein connecting the reservoir capacitor in parallel with the flying capacitor comprises:
   connecting the first reservoir capacitor node to the first flying capacitor node; and
   connecting the second reservoir capacitor node to the second flying capacitor node.

5. The DC-DC converter of claim 1, wherein during the first phase of the stabilization mode, whilst the reservoir capacitor is connected in series with the flying capacitor, the control circuitry is operable to control the first and second switching networks to:
   connect the first flying capacitor node to the input node; and
   connect the second flying capacitor node to the first inductor node.

6. The DC-DC converter of claim 1, wherein during the second phase of the stabilization mode, whilst the reservoir capacitor is connected in parallel with the flying capacitor, the control circuitry is operable to control the first and second switching networks to:
   connect the first flying capacitor node to the first inductor node.

7. The DC-DC converter of claim 1, wherein:
   the first switching network comprises:
      a first switch coupled between the first flying capacitor node and the input node and a second switch coupled between the first flying capacitor node and the first inductor node;
   the second switching network comprises:
      a third switch coupled between the second flying capacitor node and the inductor node and a fourth switch coupled between the second flying capacitor node and the reference voltage node;
   the third switching network comprises:
      a fifth switch coupled between the first reservoir capacitor node and the first flying capacitor node and a sixth switch coupled between the first reservoir capacitor node and the second flying capacitor node; and
   the fourth switching network comprises:
      a seventh switch coupled between the second reservoir capacitor node and the second flying capacitor node and an eight switch coupled between the second reservoir capacitor node and the reference voltage node.

8. The DC-DC converter of claim 7, wherein the first, second, third, fourth, fifth, sixth, seventh and eighth switches are MOSFET devices or BJT devices or IGBT devices.

9. The DC-DC converter of claim 1, further comprising a mode switch coupled between the second reservoir capacitor node and the input node.

10. The DC-DC converter of claim 1, further comprising the flying capacitor and the reservoir capacitor.

11. The DC-DC converter of claim 1, further comprising the inductor.

12. An integrated circuit comprising the DC-DC converter of claim 1.

13. A DC-DC converter for converting an input voltage at an input node, the converter comprising:
   first and second inductor nodes for connection of an inductor therebetween;
   first and second flying capacitor nodes for connection of a flying capacitor therebetween;
   a first switching network for selectively connecting the first flying capacitor node to each of the input node and to the first inductor node;
   a second switching network for selectively the second flying capacitor node to the input node and a reference voltage node; and
   reservoir circuitry, comprising:
      first and second reservoir capacitor nodes for connection of a reservoir capacitor therebetween, the second reservoir capacitor node coupled to the reference voltage;
      a reservoir switching network for selectively connecting the first reservoir capacitor node to each of the first flying capacitor node and the second flying capacitor node; and
      control circuitry configured, during a boost mode, to control the first switching network, the second switching network and the reservoir switching network:
         during a first phase, to connect the second flying capacitor node to the input node and the reference voltage node, and the first flying capacitor node to the input node and the first reservoir capacitor node; and
         during a second phase, to connect the first flying capacitor node to the first inductor node, and the second flying capacitor node to the first reservoir capacitor node, wherein:
      the first switching network comprises:
         a first switch coupled between the first flying capacitor node and the input node and a second switch coupled between the first flying capacitor node and the first inductor node;
      the second switching network comprises:
         a third switch coupled between the second flying capacitor node and the inductor node and a fourth switch coupled between the second flying capacitor node and the reference voltage node; and
      the reservoir switching network comprises:
         a fifth switch coupled between the first reservoir capacitor node and the first flying capacitor node and a sixth switch coupled between the second reservoir capacitor node and the second flying capacitor node.

14. A DC-DC converter for converting an input voltage at an input node, the converter comprising:
   first and second inductor nodes for connection of an inductor therebetween;
   first and second flying capacitor nodes for connection of a flying capacitor therebetween;
   a first switching network for selectively connecting the first flying capacitor node to each of the input node and the first inductor node;
   a second switching network for selectively connecting the second flying capacitor node to each of the input node and a reference voltage node;
   reservoir circuitry, comprising:

first and second reservoir capacitor nodes for connection of a reservoir capacitor therebetween;
a third switching network for selectively connecting the first reservoir capacitor node to each of the first and second flying capacitor nodes;
a fourth switching network for selectively connecting the second reservoir capacitor node to each of the second flying capacitor node and the reference voltage node; and
control circuitry operable in a boost mode,
wherein during a first phase of the boost mode, the control circuitry is operable to control the first and second switching networks and the reservoir circuitry to:
connect the reservoir capacitor and the flying capacitor in parallel; and
connect the input node to the first inductor node,
wherein during a second phase of the boost mode, the control circuitry is operable to control the first and second switching networks and the reservoir circuitry to connect the reservoir capacitor and the flying capacitor in series between the reference voltage node and the first inductor node.

15. A DC-DC converter for converting an input voltage at an input node, the converter comprising:
first and second inductor nodes for connection of an inductor therebetween;
first and second flying capacitor nodes for connection of a flying capacitor therebetween;
a first switching network for selectively connecting the first flying capacitor node to each of the input node and the first inductor node;
a second switching network for selectively connecting the second flying capacitor node to each of the input node and a reference voltage node;
reservoir circuitry, comprising:
first and second reservoir capacitor nodes for connection of a reservoir capacitor therebetween;
a third switching network for selectively connecting the first reservoir capacitor node to each of the first and second flying capacitor nodes;
a fourth switching network for selectively connecting the second reservoir capacitor node to each of the second flying capacitor node and the reference voltage node, wherein:
the first switching network comprises:
a first switch coupled between the first flying capacitor node and the input node and a second switch coupled between the first flying capacitor node and the first inductor node;
the second switching network comprises:
a third switch coupled between the second flying capacitor node and the inductor node and a fourth switch coupled between the second flying capacitor node and the reference voltage node;
the third switching network comprises:
a fifth switch coupled between the first reservoir capacitor node and the first flying capacitor node and a sixth switch coupled between the first reservoir capacitor node and the second flying capacitor node; and
the fourth switching network comprises:
a seventh switch coupled between the second reservoir capacitor node and the second flying capacitor node and an eight switch coupled between the second reservoir capacitor node and the reference voltage node.

* * * * *